United States Patent
Xu et al.

(10) Patent No.: US 10,666,478 B2
(45) Date of Patent: May 26, 2020

(54) DEVICE USED AT WIRELESS COMMUNICATION BASE STATION SIDE AND USER EQUIPMENT SIDE, AND METHOD

(71) Applicant: SONY CORPORATION, Tokyo (JP)

(72) Inventors: Jin Xu, Beijing (CN); Bingcheng Jin, Beijing (CN); Cheng Gao, Beijing (CN); Siqi Liu, Beijing (CN); Jinhui Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 112 days.

(21) Appl. No.: 15/758,646

(22) PCT Filed: Sep. 20, 2016

(86) PCT No.: PCT/CN2016/099450
§ 371 (c)(1),
(2) Date: Mar. 8, 2018

(87) PCT Pub. No.: WO2017/050209
PCT Pub. Date: Mar. 30, 2017

(65) Prior Publication Data
US 2018/0234278 A1    Aug. 16, 2018

(30) Foreign Application Priority Data

Sep. 24, 2015    (CN) .......................... 2015 1 0618334

(51) Int. Cl.
*H04J 11/00*    (2006.01)
*H04J 13/00*    (2011.01)
(Continued)

(52) U.S. Cl.
CPC .......... *H04L 27/2613* (2013.01); *H04J 11/00* (2013.01); *H04J 13/004* (2013.01);
(Continued)

(58) Field of Classification Search
CPC ... H04L 27/2613; H04L 5/005; H04L 5/0026; H04L 5/0021; H04L 5/0023; H04J 11/00;
(Continued)

(56) References Cited

U.S. PATENT DOCUMENTS

2011/0170435 A1*    7/2011    Kim ...................... H04L 5/0023
                                                                    370/252
2012/0207199 A1    8/2012    Guo et al.
(Continued)

FOREIGN PATENT DOCUMENTS

CN    102412840 A    4/2012
CN    102437987 A    5/2012
(Continued)

OTHER PUBLICATIONS

Chinese Office Action dated May 22, 2019, issued in corresponding Chinese Patent Application No. 201510618334.X.
(Continued)

*Primary Examiner* — Moo Jeong
(74) *Attorney, Agent, or Firm* — Xsensus LLP

(57) ABSTRACT

A device used at a wireless communication base station side and a user equipment side, and a method. The device used at a wireless communication base station side includes: a sequence generation unit configured to generate a reference signal sequence; and a resource mapping unit configured to determine a reference signal pattern composed of a mapping relationship between an antenna port and a resource element of a physical transmission resource according to the number of antenna ports for sending reference signals, and mapping the reference signal sequence to the resource unit based on the reference signal pattern for transmission, wherein the reference signal pattern includes code division multiplexing conducted on the resource unit in a frequency domain between antenna ports.

15 Claims, 28 Drawing Sheets

(51) Int. Cl.
  *H04J 13/10* (2011.01)
  *H04L 27/26* (2006.01)
  *H04L 5/00* (2006.01)
(52) U.S. Cl.
  CPC ............ *H04L 5/005* (2013.01); *H04L 5/0021* (2013.01); *H04L 5/0023* (2013.01); *H04L 5/0026* (2013.01); *H04J 2011/0006* (2013.01); *H04J 2211/005* (2013.01)
(58) Field of Classification Search
  CPC ............ H04J 13/004; H04J 2011/0006; H04J 2211/005; H04J 13/10
  See application file for complete search history.

(56) References Cited

U.S. PATENT DOCUMENTS

2013/0044728 A1    2/2013  Guo et al.
2015/0257132 A1*   9/2015  Park ..................... H04B 7/068
                                                      370/329
2016/0094326 A1*   3/2016  Moon .................. H04L 5/0026
                                                      370/330

FOREIGN PATENT DOCUMENTS

| | | |
|---|---|---|
| CN | 102594516 A | 7/2012 |
| CN | 103944685 A | 7/2014 |
| WO | 2012128505 A2 | 9/2012 |

OTHER PUBLICATIONS

International Search Report dated Nov. 30, 2016 in PCT/CN2016/099450.
"CSI-RS design for 12 and 16 ports", Huawei, HiSilicon, 3GPP TSG RAN Meeting #82, R1-153792, vol. 1, No. 1, Aug. 28, 2015, 5 pages.

* cited by examiner

Scheme one: Normal CP 32-port CSI-RS Sub-frame m

| 0 | 1 | 2 | 3 | 4 | 5 | 6 | 7 | 8 | 9 | 10 | 11 | 12 | 13 |
|---|---|---|---|---|---|---|---|---|---|----|----|----|----|
|   |   |   |   |   |   |   |   |   | 0 | 1  |    |    |    |
|   |   |   |   |   | 0 | 1 |   |   | 4 | 5  |    |    |    |
|   |   |   | 8 | 9 |   |   |   |   | 8 | 9  |    | 0  | 1  |
|   |   |   | 12| 13|   |   |   |   | 12| 13 |    | 4  | 5  |
|   |   |   |   |   | 4 | 5 |   |   | 8 | 9  |    |    |    |
|   |   |   |   |   |   |   |   |   | 12| 13 |    |    |    |
|   |   |   |   |   |   |   |   |   | 2 | 3  |    |    |    |
|   |   |   |   |   |   |   |   |   | 6 | 7  |    |    |    |
|   |   |   | 10| 11|   |   |   |   | 10| 11 |    | 2  | 3  |
|   |   |   | 14| 15|   |   |   |   | 14| 15 |    | 6  | 7  |
|   |   |   |   |   | 2 | 3 |   |   | 10| 11 |    |    |    |
|   |   |   |   |   | 6 | 7 |   |   | 14| 15 |    |    |    |

Scheme two: Normal CP 32-port CSI-RS Sub-frame m+1

| 0 | 1 | 2 | 3 | 4 | 5 | 6 | 7 | 8 | 9 | 10 | 11 | 12 | 13 |
|---|---|---|---|---|---|---|---|---|---|----|----|----|----|
|   |   |   |   |   |   |   |   |   | 16| 17 |    |    |    |
|   |   |   |   |   |   |   |   |   | 20| 21 |    |    |    |
|   |   |   | 24| 25| 16| 17|   |   | 24| 25 |    | 16 | 17 |
|   |   |   | 28| 29| 20| 21|   |   | 28| 29 |    | 20 | 21 |
|   |   |   |   |   |   |   |   |   | 24| 25 |    |    |    |
|   |   |   |   |   |   |   |   |   | 28| 29 |    |    |    |
|   |   |   |   |   |   |   |   |   | 18| 19 |    |    |    |
|   |   |   |   |   |   |   |   |   | 22| 23 |    |    |    |
|   |   |   | 26| 27| 18| 19|   |   | 26| 27 |    | 18 | 19 |
|   |   |   | 30| 31| 22| 23|   |   | 30| 31 |    | 22 | 23 |
|   |   |   |   |   |   |   |   |   | 26| 27 |    |    |    |
|   |   |   |   |   |   |   |   |   | 30| 31 |    |    |    |

Scheme Three

| Normal CP 16-port CSI-RS | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
|  |  |  |  |  |  |  |  | 0 |  | 1 |  |  |  |
|  |  |  |  |  |  |  |  | 4 |  | 5 |  |  |  |
|  |  |  |  |  |  |  |  | 8 |  | 9 |  |  |  |
|  |  |  |  |  |  |  |  | 12 |  | 13 |  |  |  |
|  |  |  |  |  |  |  |  | 0 |  | 1 |  |  |  |
|  |  |  |  |  |  |  |  | 4 |  | 5 |  |  |  |
|  |  |  |  |  |  |  |  | 2 |  | 3 |  |  |  |
|  |  |  |  |  |  |  |  | 6 |  | 7 |  |  |  |
|  |  |  |  |  |  |  |  | 10 |  | 11 |  |  |  |
|  |  |  |  |  |  |  |  | 14 |  | 15 |  |  |  |
|  |  |  |  |  |  |  |  | 2 |  | 3 |  |  |  |
|  |  |  |  |  |  |  |  | 6 |  | 7 |  |  |  |

Figure 14

| Normal CP 12-port CSI-RS | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| | | | | | | | | 0 | | 1 | | | |
| | | | | | | | | 4 | | 5 | | | |
| | | | | | | | | 8 | | 9 | | | |
| | | | | | | | | 0 | | 1 | | | |
| | | | | | | | | 4 | | 5 | | | |
| | | | | | | | | 8 | | 9 | | | |
| | | | | | | | | 2 | | 3 | | | |
| | | | | | | | | 6 | | 7 | | | |
| | | | | | | | | 10 | | 11 | | | |
| | | | | | | | | 2 | | 3 | | | |
| | | | | | | | | 6 | | 7 | | | |
| | | | | | | | | 10 | | 11 | | | |

| Extended CP 12-port CSI-RS ||||||||||||
|---|---|---|---|---|---|---|---|---|---|---|---|
| 0 | 1 | 2 | 3 | 4 | 5 | 6 | 7 | 8 | 9 | 10 | 11 |
| | | | | | | | 0 | 1 | | | |
| | | | | | | | 4 | 5 | | | |
| | | | | | | | 8 | 9 | | | |
| | | | | | | | 2 | 3 | | | |
| | | | | | | | 6 | 7 | | | |
| | | | | | | | 10 | 11 | | | |
| | | | | | | | 0 | 1 | | | |
| | | | | | | | 4 | 5 | | | |
| | | | | | | | 8 | 9 | | | |
| | | | | | | | 2 | 3 | | | |
| | | | | | | | 6 | 7 | | | |
| | | | | | | | 10 | 11 | | | |

| Extended CP 16-port CSI-RS |||||||||||||||
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| | | 0 | 1 | 0 | 1 | | | | | | | | |
| | | 0 | 1 | | | | | | | | | | |
| | | | | 0 | 1 | | | | | | | | |
| | | 2 | 3 | 2 | 3 | | | | | | | | |
| | | 2 | 3 | | | | | | | | | | |
| | | | | 2 | 3 | | | | | | | | |
| | | 4 | 5 | 4 | 5 | | | | | | | | |
| | | 4 | 5 | | | | | | | | | | |
| | | | | 4 | 5 | | | | | | | | |
| | | 6 | 7 | 6 | 7 | | | | | | | | |
| | | 6 | 7 | | | | | | | | | | |
| | | | | 6 | 7 | | | | | | | | |
| 0 | 1 | 2 | 3 | 4 | 5 | 6 | 7 | 8 | 9 | 10 | 11 | 12 | 13 |
| | | 8 | 9 | 8 | 9 | | | | | | | | |
| | | 8 | 9 | | | | | | | | | | |
| | | | | 8 | 9 | | | | | | | | |
| | | 10 | 11 | 10 | 11 | | | | | | | | |
| | | 10 | 11 | | | | | | | | | | |
| | | | | 10 | 11 | | | | | | | | |
| | | 12 | 13 | 12 | 13 | | | | | | | | |
| | | 12 | 13 | | | | | | | | | | |
| | | | | 12 | 13 | | | | | | | | |
| | | 14 | 15 | 14 | 15 | | | | | | | | |
| | | 14 | 15 | | | | | | | | | | |
| | | | | 14 | 15 | | | | | | | | |

Figure 20

DEVICE USED AT WIRELESS COMMUNICATION BASE STATION SIDE AND USER EQUIPMENT SIDE, AND METHOD

This application claims the priority to the Chinese Patent Application No. 201510618334.X, entitled "DEVICE USED AT WIRELESS COMMUNICATION BASE STATION SIDE AND USER EQUIPMENT SIDE, AND METHOD" and filed with the State Intellectual Property Office of People's Republic of China on Sep. 24, 2015, which is incorporated herein by reference in its entirety.

FIELD OF THE INVENTION

The embodiments of the present disclosure generally relate to the field of wireless communications, particularly to generation of a reference signal pattern of, and more particularly to a device and method on a base station side and a user equipment side for wireless communications.

BACKGROUND OF THE INVENTION

A basic framework of a physical layer in the LTE system is built based on the orthogonal frequency division multiplexing (OFDM) and multiple input multiple output (MIMO). The OFDM is spread spectrum technology for adjusting data on multiple subcarriers in an OFDM symbol. The multiple subcarriers are spaced apart at accurate frequencies, so that the multiple subcarriers are orthogonal to each other. In the time domain, a guard interval such as a cyclic prefix (CP) may be added to each of the OFDM symbols, to prevent interference between the OFDM symbols. The cyclic prefix includes a normal cyclic prefix and an extended cyclic prefix. The MIMO, that is, multi-antenna technology, has important roles of improving a peak rate and reliability of data transmission, extending the coverage, suppressing interference, and increasing system capacity and system throughput. With continuous increase of requirements for the rate and spectrum efficiency, an important evolution aspect of the LTE system is to enhance and optimize the MIMO technology. Due to the limitation of an antenna framework of a traditional base station, the existing MIMO transmission scheme can generally control spatial distribution properties of a signal only in a horizontal plane, and cannot make full use of degree of freedom in a vertical dimension of the 3D channel, and cannot explore the potential of the MIMO technology for improving an overall efficiency and performance of a mobile communication system and the final user experience in a deep level.

The 3D MIMO technology can divide each vertical antenna element into multiple elements without changing the size of the existing antenna, in this way, another spatial dimension of the MIMO in the vertical direction is developed, and the MIMO technology is taken into a higher development stage. A wider improvement space of performance of the LTE transmission technology is opened up, so that it is possible to further reduce inter-cell interference, improve system throughput and spectrum efficiency.

However, the number of antenna ports for transmitting a reference signal supported in the 3D MIMO is increased, therefore, the existing reference signal patterns are no longer applicable, and it is required to develop a reference signal pattern applicable to more antenna ports in the 3D MIMO.

SUMMARY

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present application, there is provided a device on a base station side for wireless communications, including: a sequence generating unit, configured to generate a reference signal sequence; and a resource mapping unit, configured to determine, based on the number of antenna ports for transmitting a reference signal, a reference signal pattern constituted by a mapping relationship between the antenna ports and resource elements of physical transmission resources, and map, based on the reference signal pattern, the reference signal sequence to the resource elements for transmission, wherein the reference signal pattern comprises code division multiplexing on the resource elements among the antenna ports in a frequency domain.

According to another aspect of the present application, there is provided a device on a user equipment side for wireless communications, including: a storage unit, configured to store a reference signal pattern constituted by a mapping relationship between predetermined antenna ports and resource elements of physical transmission resources; a determining unit, configured to determine, based on the reference signal pattern and a parameter related to the reference signal from a base station side, physical resource elements corresponding to a current reference signal; and a measuring unit, configured to measure a reference signal on the determined physical resource elements, to report measured information to the base station side, wherein the reference signal pattern comprises code division multiplexing on the resource elements among the antenna ports in the frequency domain.

According to an aspect of the present application, there is provided a method on a base station side for wireless communications, including: generating a reference signal sequence; and determining, based on the number of antenna ports for transmitting a reference signal, a reference signal pattern constituted by a mapping relationship between the antenna ports and resource elements of physical transmission resources, and mapping, based on the reference signal pattern, the reference signal sequence to the resource elements for transmission, wherein the reference signal pattern comprises code division multiplexing on the resource elements among the antenna ports in the frequency domain.

According to another aspect of the present application, there is provided a method on a user equipment side for wireless communications, comprising: determining, based on a stored reference signal pattern and a parameter related to the reference signal from a base station side, physical resource elements corresponding to a current reference signal, wherein the reference signal pattern is constituted by a mapping relationship between predetermined antenna ports and resource elements of physical transmission resources; and measuring a reference signal on the determined physical resource elements, to report measured information to the base station side, wherein the reference signal pattern comprises code division multiplexing on the resource elements among the antenna ports in the frequency domain.

Computer program codes and a computer program product for implementing the method on the base station side and on the user equipment side in the wireless communication system described above, and a computer readable storage medium, on which the computer program codes for implementing the method on the base station side and on the user equipment side in the wireless communication system described above are recorded, are further provided in accordance with other aspects of the present disclosure.

In the embodiments of the present disclosure, by adopting the reference signal pattern where code division multiplexing is performed on the resource elements among the antenna ports in the frequency domain, a power gain can be maintained to not exceed 6 dB (in this case, a power amplifier of the existing antenna can be used) and waste of power is reduced in a case that the number of antenna ports for transmitting a reference signal is increased.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings:

FIG. 5 shows examples of two schemes of a CSI-RS pattern for a frequency division duplex (FDD) frame with a normal cyclic prefix in a case that the number of antenna ports is 16;

FIG. 6 shows examples of another two schemes of a CSI-RS pattern for an FDD frame with a normal cyclic prefix in a case that the number of antenna ports is 16;

FIG. 7 shows an example of another scheme of a CSI-RS pattern for an FDD frame with a normal cyclic prefix in a case that the number of antenna ports is 16;

FIG. 8 shows an example of a scheme of a CSI-RS pattern for an FDD frame with a normal cyclic prefix in a case that the number of antenna ports is 32;

FIG. 9 shows an example of another scheme of a CSI-RS pattern for an FDD frame with a normal cyclic prefix in a case that the number of antenna ports is 32;

FIGS. 10A and 10B show examples of three schemes of a CSI-RS pattern for an FDD frame with a normal cyclic prefix in a case that the number of antenna ports is 12;

FIG. 11 shows examples of two schemes of a CSI-RS pattern for an FDD frame with an extended cyclic prefix in a case that the number of antenna ports is 16;

FIG. 12 shows an example of another scheme of a CSI-RS pattern for an FDD frame with an extended cyclic prefix in a case that the number of antenna ports is 16;

FIG. 13 shows examples of two schemes of a CSI-RS pattern for a FDD frame with an extended cyclic prefix in a case that the number of antenna ports is 12;

FIG. 14 shows an example of a scheme of a CSI-RS pattern for a time division duplexing (TDD) frame with a normal cyclic prefix in a case that the number of antenna ports is 16;

FIG. 15 shows an example of a scheme of a CSI-RS pattern for a TDD frame with a normal cyclic prefix in a case that the number of antenna ports is 12;

FIG. 16 shows an example of another scheme of a CSI-RS pattern for a TDD frame with a normal cyclic prefix in a case that the number of antenna ports is 16;

FIG. 17 shows examples of two schemes of a CSI-RS pattern for a TDD frame with an extended cyclic prefix in a case that the number of antenna ports is 16;

FIG. 18 shows an example of a scheme of a CSI-RS pattern for a TDD frame with an extended cyclic prefix in a case that the number of antenna ports is 12;

FIGS. 19A and 19B show an example of a CSI-RS pattern for a special sub-frame DwPTS with a normal cyclic prefix in a TDD mode;

FIG. 20 shows an example of a CSI-RS pattern for a special sub-frame DwPTS with an extended cyclic prefix in a TDD mode;

DETAILED DESCRIPTION OF THE EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

Figure 1:
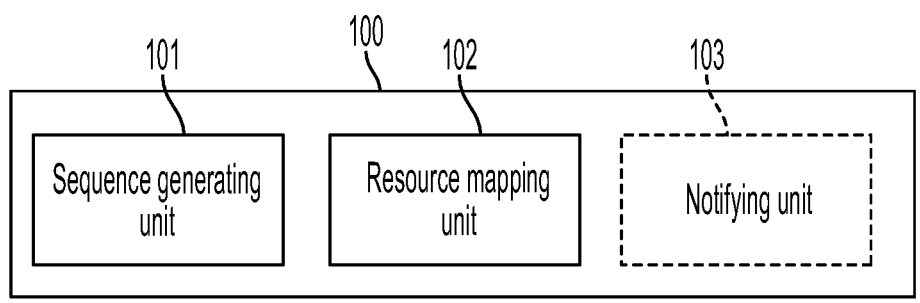
FIG. 1 is a structural block diagram of a device on a base station side for wireless communications according to an embodiment of the present disclosure.

FIG. 1 is a structural block diagram of a device 100 on a base statin side for wireless communications according to an embodiment of the present disclosure. As shown in FIG. 1, the device 100 includes: a sequence generating unit 101, configured to generate a reference signal sequence; and a resource mapping unit 102, configured to determine, based on the number of antenna ports for transmitting a reference signal, a reference signal pattern constituted by a mapping relationship between the antenna ports and resource elements of physical transmission resources, and map, based on the reference signal pattern, the reference signal sequence to the resource elements for transmission, wherein the reference signal pattern comprises code division multiplexing on the resource elements among the antenna ports in a frequency domain (that is, the reference signal sequences are processed using orthogonal codes and then transmitted in a same resource element).

Figure 2:
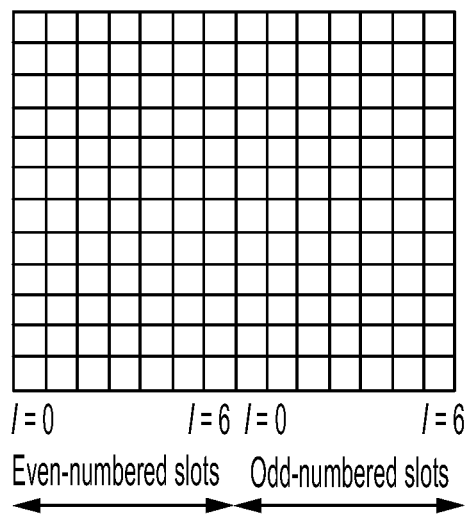
FIG. 2 is a diagram showing an example a resource grid of a physical resource block (PRB) in a case that a normal cyclic prefix is used in each of OFDM symbols.

For an LTE downlink frame, each frame is divided into 10 sub-frames with the same size, each sub-frame includes two consecutive slots, and the two consecutive slots correspond to one physical resource block (PRB). A resource grid may be used to represent physical transmission resources of the PRB (the time length of which is equal to the length of the sub-frame), and the resource grid of the PRB is divided into multiple resource elements. The PRB includes 12 consecutive subcarriers in the frequency domain. The PRB includes 14 consecutive OFDM symbols in the time domain in a case that a normal cyclic prefix is used in each of the OFDM symbols, and therefore, the PRB is divided into 168 resource elements. The PRB includes 6 consecutive OFDM symbols in the time domain in a case that an extended cyclic prefix is used in each of the OFDM symbols, and therefore, the PRB is divided into 144 resource elements. FIG. 2 shows a resource grid of the PRB in a case that a normal cyclic prefix is used in each of OFDM symbols as an example, where the horizontal axis denotes time, and the vertical axis denotes a frequency. All drawings of resource grids in the present disclosure are defined as above, and are not illustrated below separately anymore.

After the sequence generating unit 101 generates the reference signal sequence, the resource mapping unit 102 is configured to map the reference signal sequence to appropriate resource elements for transmission. In order to ensure that the reference signal can be received by a user equipment correctly and avoid interference between reference signals, a mapping relationship between antenna ports for transmitting a reference signal and resource elements of physical transmission resources, that is, a reference signal pattern, is to be set. As described above, the number of antenna ports for transmitting the reference signal is increased continuously with development of the LTE technology. For example, the number of antenna ports is increased from the current 1, 2, 4 and 8 to 12, 16, 32 and 64, and the like. Therefore, a new mapping relationship is needed to be designed for reference signals corresponding to the increased number of antenna ports. Since the number or positions of used resource elements are different in a case that different numbers of antenna ports are used, the different numbers of antenna ports correspond to different mapping relationships.

In the embodiment, the resource mapping unit 102 is configured to determine the reference signal pattern constituted by the above mapping relationship based on the number of antenna ports for transmitting the reference signal before mapping. In the reference signal pattern, code division multiplexing is performed on the resource elements among antenna ports in the frequency domain. For example, two antenna ports multiplex two resource elements in a vertical column shown in FIG. 2.

In an example, the resource mapping unit 102 is configured to configure at least two common resource elements (which are located in a same column in FIG. 2) corresponding to a same OFDM symbol for two antenna ports, that is, a first antenna port and a second antenna port, and configure orthogonal cover codes (OCC) which are orthogonal to each other for the first antenna port and the second antenna port respectively, to perform code division multiplexing on the resource elements among antenna ports in the frequency domain.

Figure 3B:
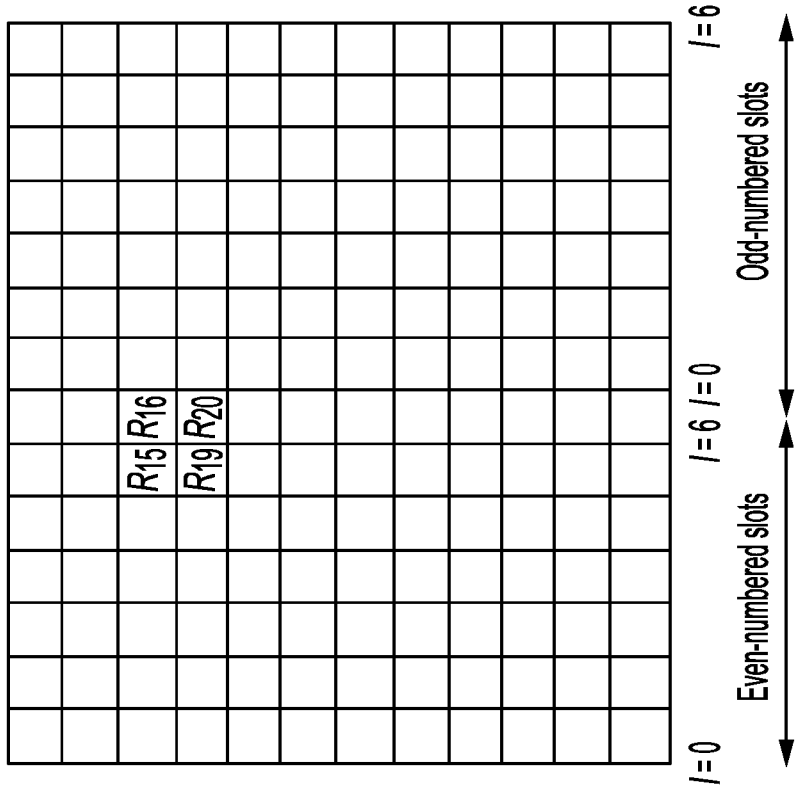
FIG. 3B is a schematic diagram showing an example of performing code division multiplexing on resource elements by a first antenna port and a second antenna port in the time domain and in the frequency domain.
Figure 3A:
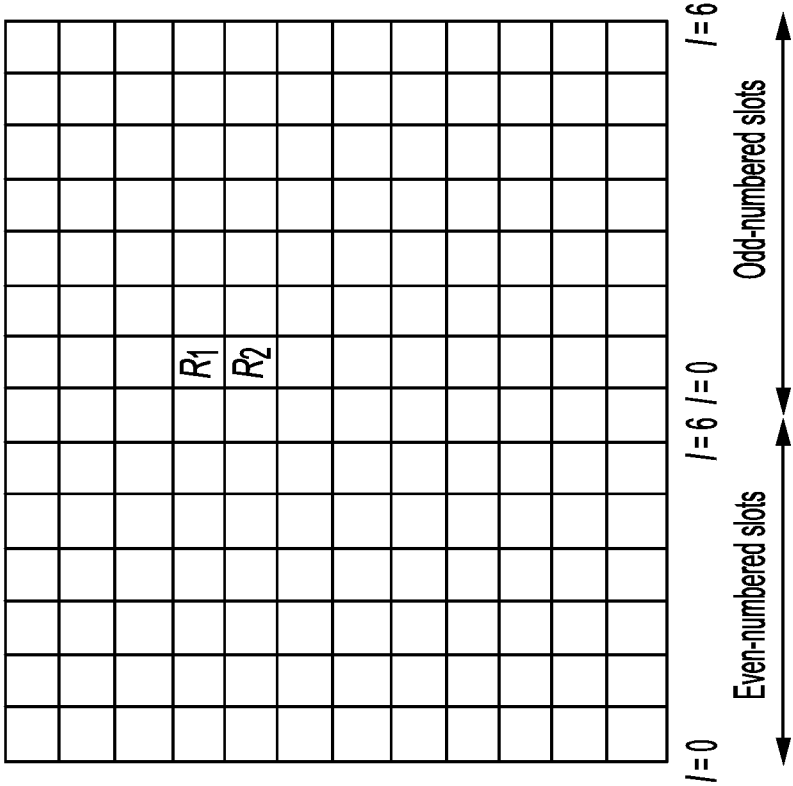
FIG. 3A is a schematic diagram showing an example of performing code division multiplexing on resource elements by a first antenna port and a second antenna port in the frequency domain.

FIG. 3A shows an example of performing code division multiplexing on resource elements by the first antenna port 1 and the second antenna port 2 in the frequency domain. It should be understood that although adjacent resource elements are multiplexed by the port 1 and the port 2 in the frequency domain in FIG. 3A, the present disclosure is not limited thereto, and the resource elements may be not adjacent.

Figure 4A:
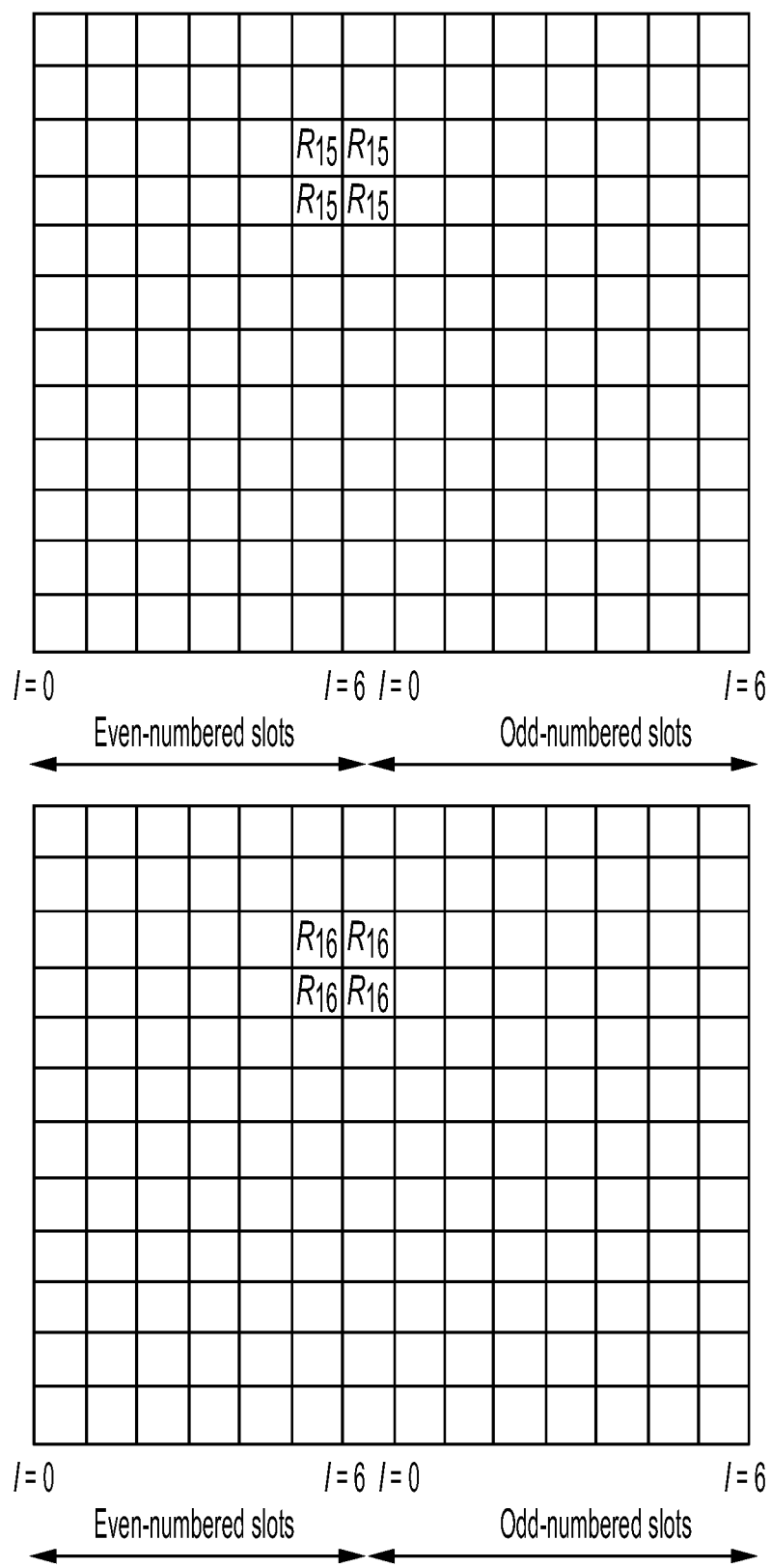
FIGS. 4A and 4B are illustrative diagrams showing specific multiplexing situation in FIG. 3B.
Figure 4B:
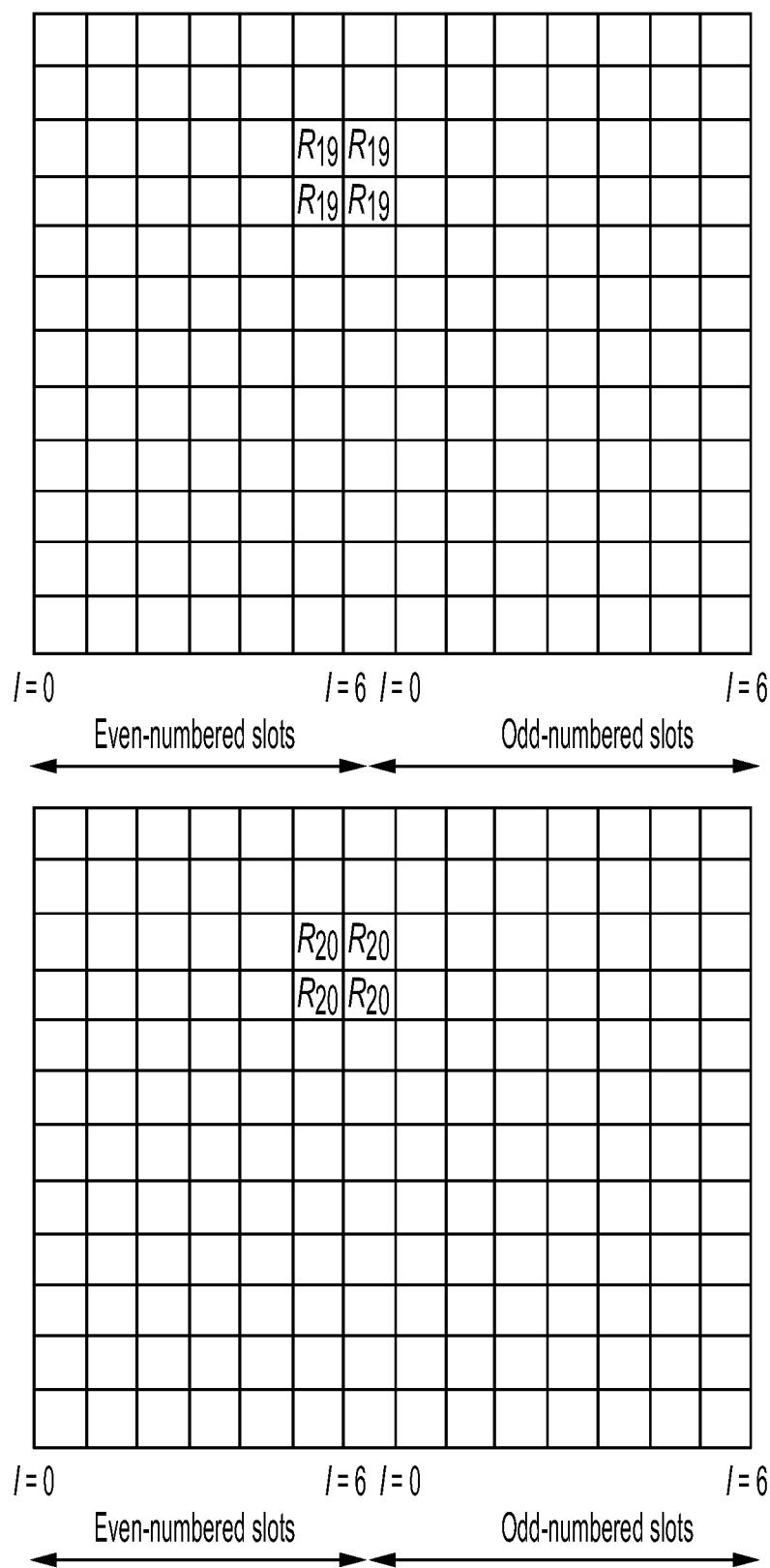

In addition, the reference signal pattern may also include code division multiplexing on the resource elements among the antenna ports in time domain. FIG. 3B shows an example where four resource elements in a shape of "▦" are multiplexed by antenna ports 15, 16, 19 and 20. A specific multiplexing situation is shown in FIGS. 4A and 4B, that is, time-domain code division multiplexing and frequency-domain code division multiplexing are adopted simultaneously.

In an example, the resource mapping unit 102 is configured to configure at least two antenna ports having port numbers with a same parity, to realize code division multiplexing in the frequency domain. For example, in the example shown in FIG. 3B, odd-numbered ports 15 and 19 perform code division multiplexing in the frequency domain, and even-numbered ports 16 and 20 perform code division multiplexing in the frequency domain. Meanwhile, the odd-numbered port 15 and the even-numbered port 16 perform code division multiplexing in time domain, and the odd-numbered port 19 and the even-numbered port 20 perform code division multiplexing in time domain. That is, hybrid frequency-domain code division multiplexing and time-domain code division multiplexing is used in the example shown in FIG. 3B. In practice, the number of antenna ports which perform the frequency-domain code division multiplexing or the time-domain code division multiplexing may also be greater than 2, for example, the number of antenna ports is 4. In another example, the resource mapping unit 102 may be configured to configure at least one pair of antenna ports having adjacent odd-numbered port number and even-numbered port number to perform code division multiplexing in the frequency domain. Still taking FIG. 3B as an example, the odd-numbered port 15 and the even-numbered port 16 forms a pair of antenna ports and the odd-numbered port 19 and the even-numbered port 20 forms a pair of antenna ports. In a case that the length of code division multiplexing is 2, for example, the antenna ports in the antenna port pair perform time-domain code division multiplexing. In a case that the length of code division multiplexing is 4, two antenna port pairs further perform frequency-domain code division multiplexing.

In addition, the resource mapping unit 102 may be further configured to adopt a code division multiplexing manner with a large code length in a case that there are a large number of antenna ports, to be compatible with a code division multiplexing manner with a small code length in a case that there is a small number of antenna ports. For example, in a case that the number of antenna ports is 2, 4 and 8, code division multiplexing with the code length of 2 may be adopted. In a case that the number of antenna ports is 12, 16, 32, 64 and the like, code division multiplexing with the code length of 4 or a larger code length may be adopted. A schematic example of such compatibility is given in conjunction with description in FIG. 3B, and is particularly shown in an example of the reference signal pattern to be shown hereinafter.

In addition, the resource mapping unit 102 may be further configured to determine, for the first antenna port, a reference signal pattern crossing a first number such as two OFDM symbols; and determine, for the second antenna port, a reference signal pattern crossing a second number such as four OFDM symbols, to transmit the first antenna port and the second antenna port, respectively. In this way, flexibility of resource mapping can be improved, and idle resource elements are used fully to transmit the reference signals.

In designing the reference signal pattern, at least one of the following principles may be followed: ensuring that a power gain does not exceed 6 dB, so that an existing power amplifier can be continued to be used; reducing waste of power as much as possible; ensuring backward compatibility; avoiding occupying a resource element which is already occupied by another reference signal as much as possible to avoid conflict; and increasing a multiplexing factor as much as possible. It should be illustrated that in a set of CSI-RS configuration, in a case that (n+1) antenna ports are distributed on a same OFDM symbol, one of the (n+1) antenna ports performs transmission while n antenna ports of the (n+1) antenna ports than the one antenna port is in silence, and transmission power of each of the silent antenna ports is added to transmission power of the antenna port for the transmission, to realize full-power utilization, and a power gain of the antenna port for transmission is n*2 dB. However, the number of antenna ports distributed on the same OFDM symbol is increased correspondingly with the increase of the number of antenna ports, and how to ensure that the power gain does not exceed 6 dB to continue to use the existing power amplifier of the antenna and realize full-power utilization becomes an issue to be studied.

The design of the reference signal pattern according to the embodiment is described below by taking a channel status information reference signal (CSI-RS) as an example. In an example, the resource mapping unit 102 is configured to, in a case that the number of antenna ports for transmitting a reference signal is greater than 8, determine a reference signal pattern including multiplexing resource elements among the antenna ports in the frequency domain for resource mapping.

Figure 5:
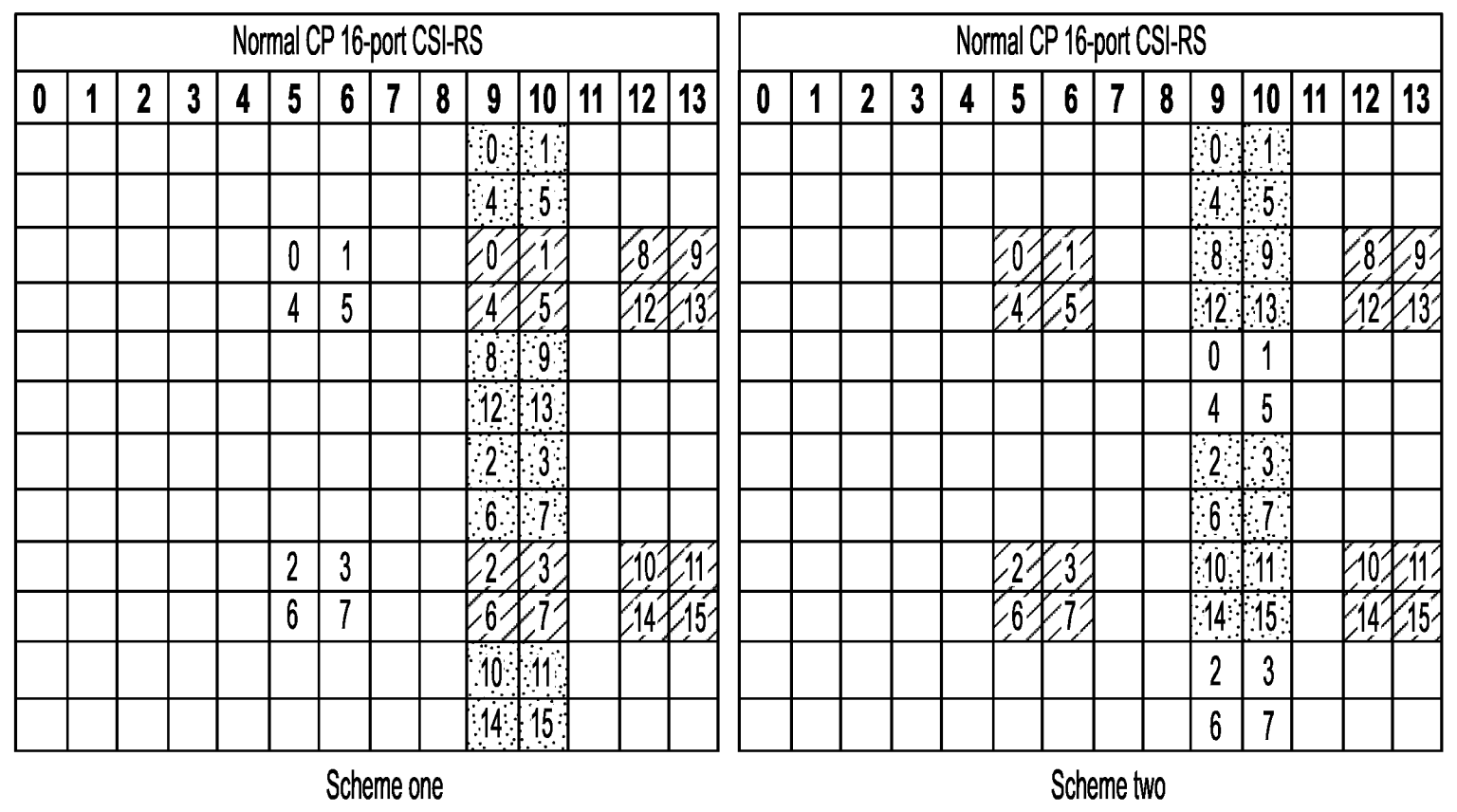

FIG. 5 shows examples of two schemes of a CSI-RS pattern for an FDD frame with a normal cyclic prefix in a case that the number of antenna ports is 16. In the example, an antenna port for the CSI-RS is ports 0 to 15, however, it should be understood that the ports are only schematic, and do not represent port numbers used actually, and the ports may be any antenna ports having other numbers in practice. In FIG. 5, resource elements filled with gray and resource elements filled with black spots represent optional CSI-RS configurations, respectively, for example, which may be used for a cell. It may be seen that each of the schemes in FIG. 5 includes two sets of CSI-RS configurations, and therefore a multiplexing factor is 2. The multiplexing factor is reduced as compared with a multiplexing factor of 5 in a case that there are 8 antenna ports.

Sets of ports for code division multiplexing are ports {0,1,8,9}, ports {4,5,12,13}, ports {2,3,10,11} and ports {6,7,14,15}, in which code division multiplexing with the length of 4 is used. For example, ports 0, 1, 8 and 9 are provided with four orthogonal OCC codes with the length of 4 to share four resource elements. It should be noted that for the sake of clarity, specific resource multiplexing situation in each set of ports is not drawn in FIG. 5 and the latter drawings by the inventor, as shown in FIGS. 4A and 4B corresponding to FIG. 3B, and those skilled in the art may understand and restore a grid chart of the specific multiplexing according to the spirit and description of the present disclosure. In a scheme one, only time-domain code division multiplexing is used in a configuration 0 filled with gray, and the time-domain code division multiplexing and the frequency-domain code division multiplexing are used in a configuration 1 filled with block dots. It can be seen from FIG. 5 that resource elements multiplexed among the antenna ports in the time domain and in the frequency domain are not adjacent. Specifically, resource elements involved in the configuration 0 are distributed on four OFDM symbols, and four ports included in each set of ports can perform code division multiplexing only in the horizontal time domain. Since four resource elements are available for CSI-RS at four ports in each OFDM symbol, a power gain is 6 dB in a case that a CSI-RS is transmitted at one of the ports. Resource elements involved in the configuration 1 are distributed on only two OFDM symbols, and eight antenna ports (for example, ports 0, 4, 8, 12, 2, 6, 10 and 14 are located in a same OFDM symbol) are provided on each OFDM symbol. Therefore, it cannot ensure the power gain does not exceed 6 dB and full-power utilization is realized simultaneously in a case of only adopting the time-domain coding division multiplexing. Four ports in each set of ports in the exemplary scheme of the present disclosure perform code division multiplexing in the frequency domain and in the time domain. For example, ports 0, 1, 8 and 9 occupy four resource elements distributed in the vertical frequency domain and in the horizontal time domain. In this case, ports 0 and 8 perform transmission while other six ports are in silence, a power gain of 6*2 dB=12 dB may be equally divided between port 0 and port 8, thereby ensuring that a power gain of each of the ports is 6 dB and realizing full-power utilization. The scheme two is similar to the scheme one with a difference in that different resource elements are occupied.

In the CSI-RS configurations shown in FIG. 5, ports are re-mapped to existing resource elements for the CSI-RS and no new resource element is added. Grids filled with white marked with the antenna port numbers shown in FIG. 5 represent resource elements used by a set of CSI-RS configuration originally in a case that there are eight antenna ports, and the resource elements are not used in a case that there are 16 ports. In the schemes shown in FIG. 5, a density of the CSI-RS is to maintain one resource element per port per PRB (1 RE/port/PRB), that is, each set of CSI-RS configuration does not cross two PRBs.

In a transmission process of the CSI-RS, a reference signal sequence $r_{l,n_s}(m)$ is mapped to a complex value symbol $a_{k,l}^{(p)}$ according to a certain mapping relationship, where $r_{l,n_s}(m)$ is defined according to equation as follows:

$$r_{l,n_s}(m) = \frac{1}{\sqrt{2}}(1 - 2 \cdot c(2m)) + j\frac{1}{\sqrt{2}}(1 - 2 \cdot c(2m+1)), \quad (1)$$

$$m = 0, 1, \ldots, N_{RB}^{max,DL} - 1$$

where $n_s$ denotes a slot number in a radio frame, l denotes an OFDM symbol number in a slot, $c(\cdot)$ denotes a pseudo random sequence and is generated by a pseudo random sequence generator, $N_{RB}^{max,DL}$ denotes a maximum downlink bandwidth of the system.

The reference signal sequence is mapped to a complex value symbol according to the equation as follows, and the complex value symbol serves as a reference symbol at an antenna port (the equation is suitable for the mapping in various situations, which is not repeated hereinafter anymore):

$$a_{k,l}^{(p)} = w \cdot r_{l,n_s}(m') \quad (2)$$

where p denotes an antenna port number. For the scheme one in FIG. 5, parameters in equation (2) are set as follows:

$$k = k' + 12m + \begin{cases} -0 & p \in \{15, 16\}, CSI\text{-}RS \text{ configuration } 1 \\ -6 & p \in \{17, 18\}, CSI\text{-}RS \text{ configuration } 1 \\ -1 & p \in \{19, 20\}, CSI\text{-}RS \text{ configuration } 1 \\ -7 & p \in \{21, 22\}, CSI\text{-}RS \text{ configuration } 1 \\ -4 & p \in \{23, 24\}, CSI\text{-}RS \text{ configuration } 1 \\ -10 & p \in \{25, 26\}, CSI\text{-}RS \text{ configuration } 1 \\ -5 & p \in \{27, 28\}, CSI\text{-}RS \text{ configuration } 1 \\ -11 & p \in \{29, 30\}, CSI\text{-}RS \text{ configuration } 1 \\ -0 & p \in \{15, 16, 23, 24\}, CSI\text{-}RS \text{ configuration } 0 \\ -6 & p \in \{17, 18, 25, 26\}, CSI\text{-}RS \text{ configuration } 0 \\ -1 & p \in \{19, 20, 27, 28\}, CSI\text{-}RS \text{ configuration } 0 \\ -7 & p \in \{21, 22, 29, 30\}, CSI\text{-}RS \text{ configuration } 0 \end{cases}$$

$$l = l' + \begin{cases} l'', l'' + 3 & CSI\text{-}RS \text{ configuration } 0 \\ l'' & CSI\text{-}RS \text{ configuration } 1 \end{cases}$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

$$l'' = 0, 1$$

where $N_{RB}^{DL}$ denotes the number of resource blocks allocated to the downlink, and depends on a downlink bandwidth of the cell. CSI-RS configuration 0 corresponds to resource elements filled with gray, and CSI-RS configuration 1 corresponds to resource elements filled with black dots. A value of the sequence $w=w_p(i)$ may be obtained from Table 1 as follows. The number of antenna port P used here may refer to an actual antenna port number (15-30 correspond to 1-15 in FIG. 5, and so do in the following examples).

TABLE 1

| Antenna Port P | [$w_p(0)$ $w_p(1)$ $w_p(2)$ $w_p(3)$] |
|---|---|
| 15/17/19/21 | [+1 +1 +1 +1] |
| 16/18/20/22 | [+1 −1 +1 −1] |
| 23/25/27/29 | [+1 +1 −1 −1] |
| 24/26/28/30 | [+1 −1 −1 +1] |

A mapping relationship between CSI-RS configurations and (k', l') may be obtained from Table 2 as follows.

TABLE 2

|  | (k', l') | $n_s$ mod 2 |
|---|---|---|
| CSI-RS configuration 0 | (9, 2) | 1 |
| CSI-RS configuration 1 | (11, 2) | 1 |

For the scheme two in FIG. 5, parameters in equation (2) are set as follows:

$$k = k' + 12m + \begin{cases} -0 & p \in \{15, 16\}, CSI\text{-}RS \text{ configuration } 1 \\ -6 & p \in \{17, 18\}, CSI\text{-}RS \text{ configuration } 1 \\ -1 & p \in \{19, 20\}, CSI\text{-}RS \text{ configuration } 1 \\ -7 & p \in \{21, 22\}, CSI\text{-}RS \text{ configuration } 1 \\ -2 & p \in \{23, 24\}, CSI\text{-}RS \text{ configuration } 1 \\ -8 & p \in \{25, 26\}, CSI\text{-}RS \text{ configuration } 1 \\ -3 & p \in \{27, 28\}, CSI\text{-}RS \text{ configuration } 1 \\ -9 & p \in \{29, 30\}, CSI\text{-}RS \text{ configuration } 1 \\ -0 & p \in \{15, 16, 23, 24\}, CSI\text{-}RS \text{ configuration } 0 \\ -6 & p \in \{17, 18, 25, 26\}, CSI\text{-}RS \text{ configuration } 0 \\ -1 & p \in \{19, 20, 27, 28\}, CSI\text{-}RS \text{ configuration } 0 \\ -7 & p \in \{21, 22, 29, 30\}, CSI\text{-}RS \text{ configuration } 0 \end{cases}$$

$$l = l' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

$$l'' = 0, 1$$

where CSI-RS configuration 0 corresponds to resource elements filled with gray, and CSI-RS configuration 1 corresponds to resource elements filled with black dots. A value of the sequence $w=w_p(i)$ may be obtained from Table 3 as follows.

TABLE 3

| Antenna Port P | [$w_p(0)$ $w_p(1)$ $w_p(2)$ $w_p(3)$] |
|---|---|
| 15/17/19/21 | [+1 +1 +1 +1] |
| 16/18/20/22 | [+1 −1 +1 −1] |
| 23/25/27/29 | [+1 +1 −1 −1] |
| 24/26/28/30 | [+1 −1 −1 +1] |

A mapping relationship between CSI-RS configurations and (k', l') may be obtained from Table 4 as follows.

TABLE 4

|  | (k', l') | $n_s$ mod 2 |
|---|---|---|
| CSI-RS configuration 0 | (9, 5) | 0/1 |
| CSISI-RS configuration 1 | (11, 2) | 1 |

However, the CSI-RS configuration is not limited thereto, and may use other manners. For example, a CSI-RS pattern may include at least one of: a pattern based on one PRB, a pattern based on two or more adjacent sub-frames; and a pattern based on two or more adjacent PRBs.

Figure 6:
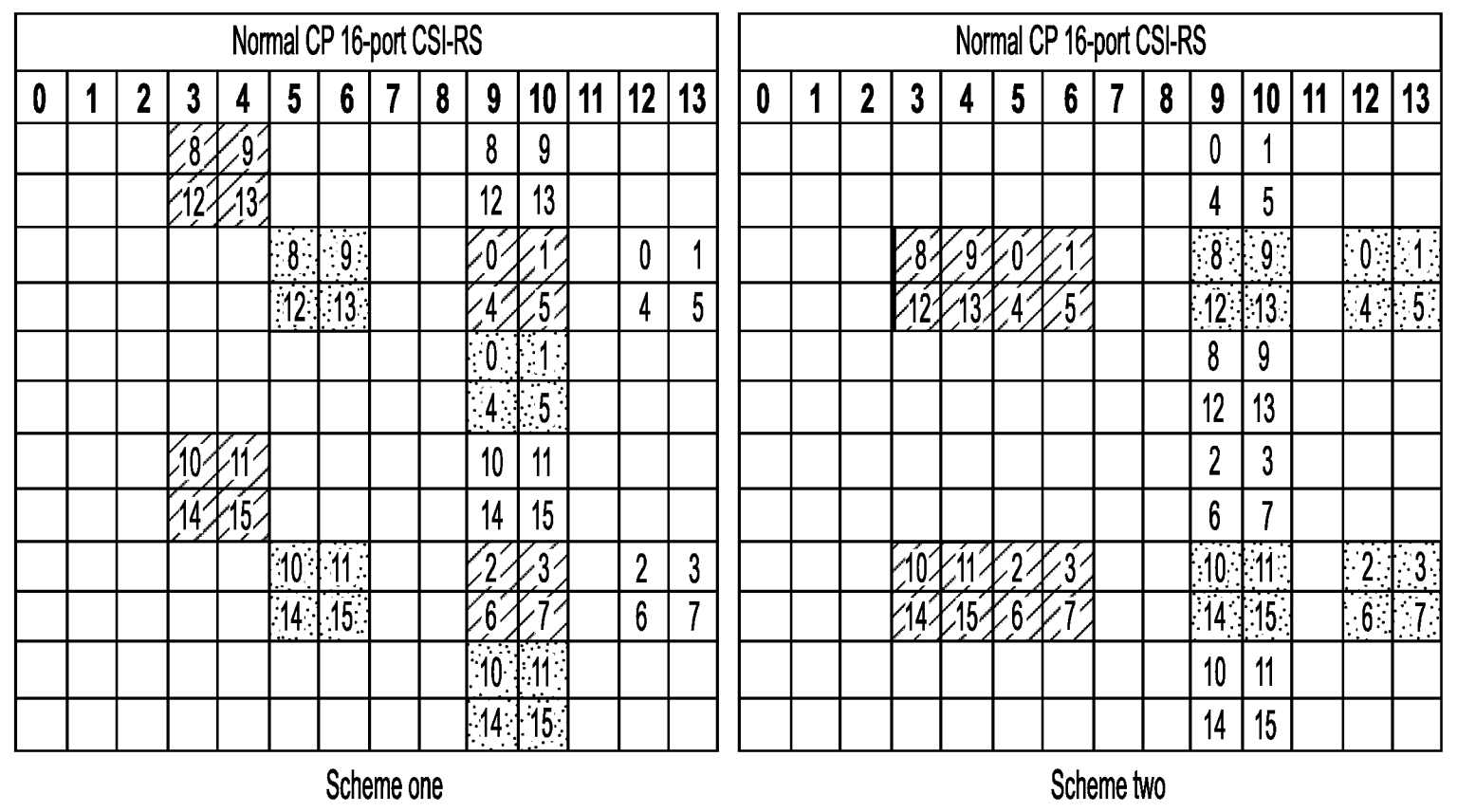

FIG. 6 shows examples of two schemes of a CSI-RS pattern for an FDD frame with a normal cyclic prefix acquired by adding resource elements for the CSI-RS in the PRB in a case that the number of antenna ports is 16. In the two schemes, the three sets of CSI-RS configurations are filled with gray, white and black dots, respectively. Each of the two schemes includes three sets of CSI-RS configurations, and thus, a multiplexing factor is 3. Eight resource elements in a third OFDM symbol and in a four OFDM symbol are added for transmitting a CSI-RS. In the scheme one, time-domain code division multiplexing with a multiplexing length of 4 is used. In the scheme two, hybrid time-domain code division multiplexing with the length of 2 and frequency-domain code division multiplexing with the length of 2 which is similar to configuration 1 in FIG. 5 is used for the CSI-RS configuration filled with white, and time-domain code division multiplexing with a multiplexing length of 4 is used for the CSI-RS configurations filled with gray and black dots. The same as the scheme in FIG. 5, a mapping relationship between the CSI-RS and resource elements may be represented using equation (2) similarly, which is not described in detail anymore.

Figure 7:
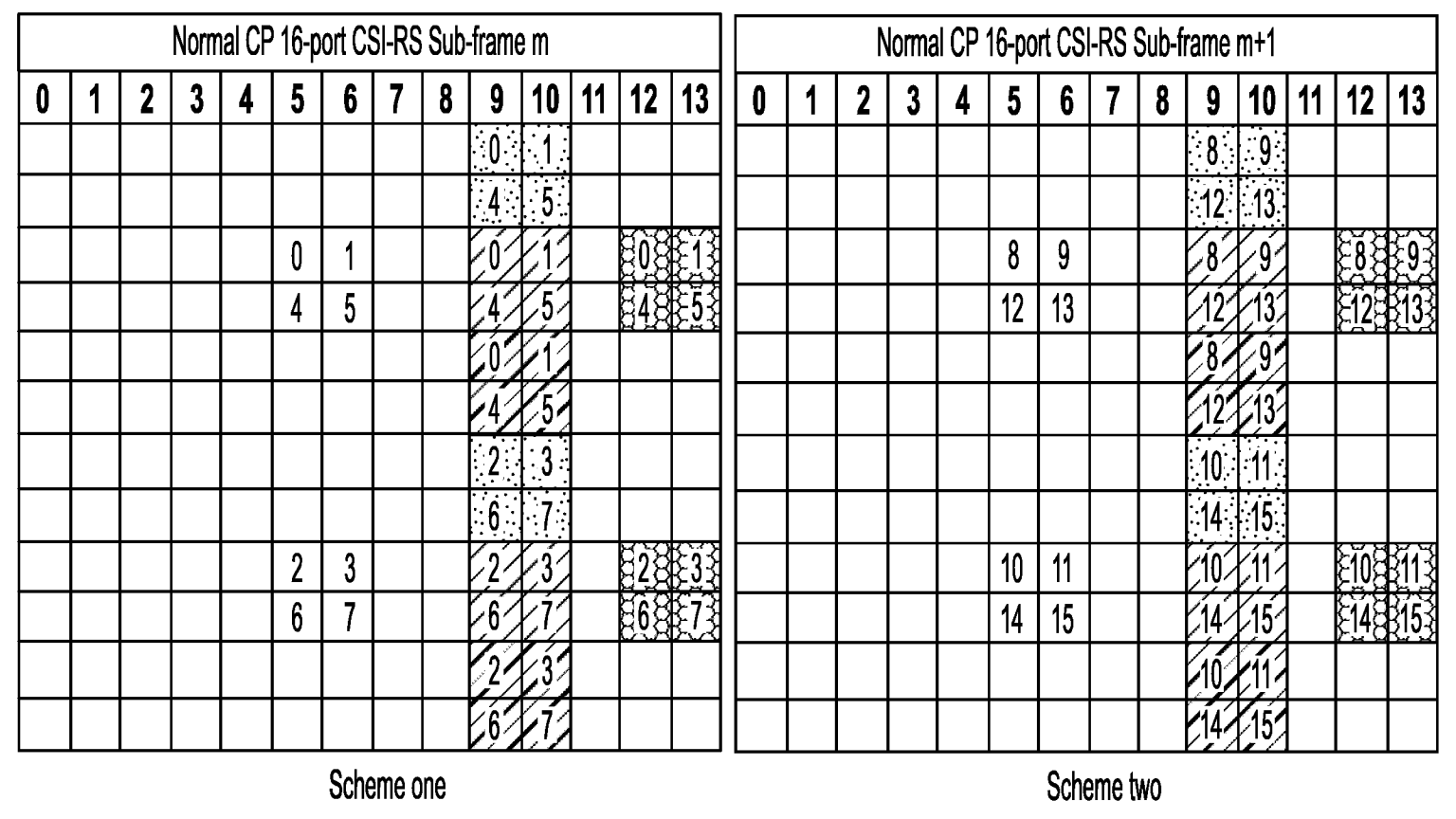

FIG. 7 shows an example of a scheme of a CSI-RS pattern for an FDD frame with a normal cyclic prefix designed based on two adjacent sub-frames in a case that the number of antenna ports is 16. In FIG. 7, five sets of CSI-RS configurations are shown, each filled with white, gray, black dots, horizontal lines and oblique lines, that is, a multiplexing factor is 5. The CSI-RS pattern in FIG. 7 is composed of a CSI-RS pattern of eight ports in each of two different sub-frames. Ports 1 to 7 for CSI-RS are located in a sub-frame m, and ports 8 to 15 for CSI-RS are located in a sub-frame m+1. The CSI-RS pattern is designed in this way to avoid conflict with other reference signals or a control signal in the PDCCH. However, a density of the CSI-RS is reduced to be 0.5RE/port/PRB. With regard to the CSI-RS multiplexing manner, the code division multiplexing with the length of 2 in the Rel-10 between odd-numbered ports and even-numbered ports is still used.

Therefore, the code length in code division multiplexing is changed with the number of sub-frames on which the CSI-RS pattern is based. In a case that the number of antenna ports is 16, the code length of code division multiplexing is 4 in a case that the number of sub-frames on which the CSI-RS pattern is based is 1, and the code length of code division multiplexing is 2 in a case that the number of sub-frames on which the CSI-RS pattern is based is 2.

Figure 9:
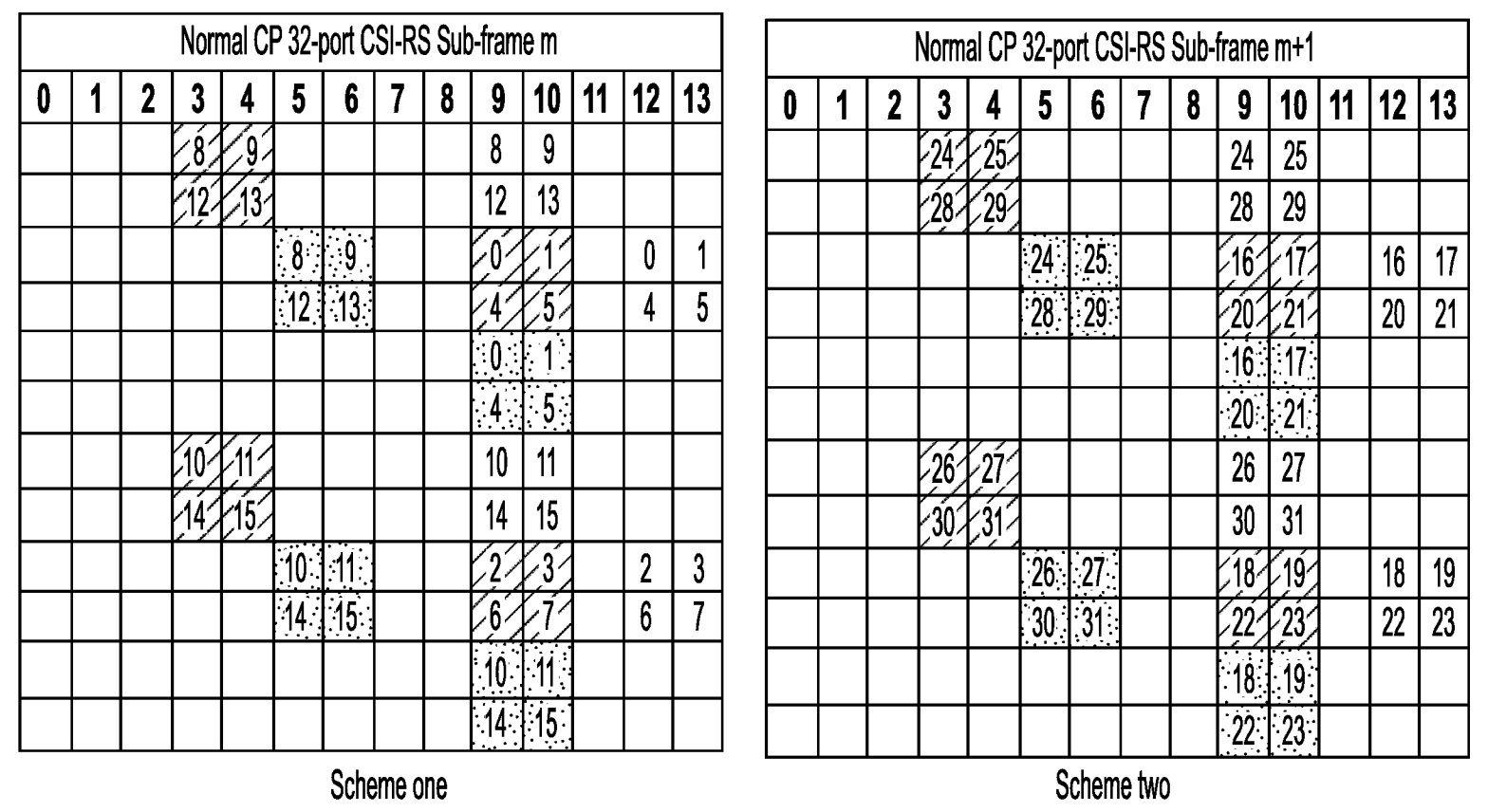

In a case that there are more ports such as 32 ports, the CSI-RS pattern may be designed based on two adjacent sub-frames in a similar way. For example, the CSI-RS pattern is an extension of the code division multiplexing CSI-RS pattern with a code length of 4 in two adjacent sub-frames. As an example, the two schemes shown in FIG. 6 can be extended in two adjacent sub-frames. As shown in FIG. 8 and FIG. 9, ports 0 to 15 for CSI-RS are located in a sub-frame m, and ports 16 to 31 for CSI-RS are located in a sub-frame m+1. In practice, the schemes in FIG. 5 can also be extended in two adjacent sub-frames. In a case that there are much more ports, extension may be performed in more adjacent sub-frames correspondingly.

In addition, when designing a CSI-RS pattern, physical resource elements corresponding to a same port may be far away from each other in the CSI-RS patterns for different cells. In this way, inter-cell interference between reference signals can be further reduced.

Figure 10A:
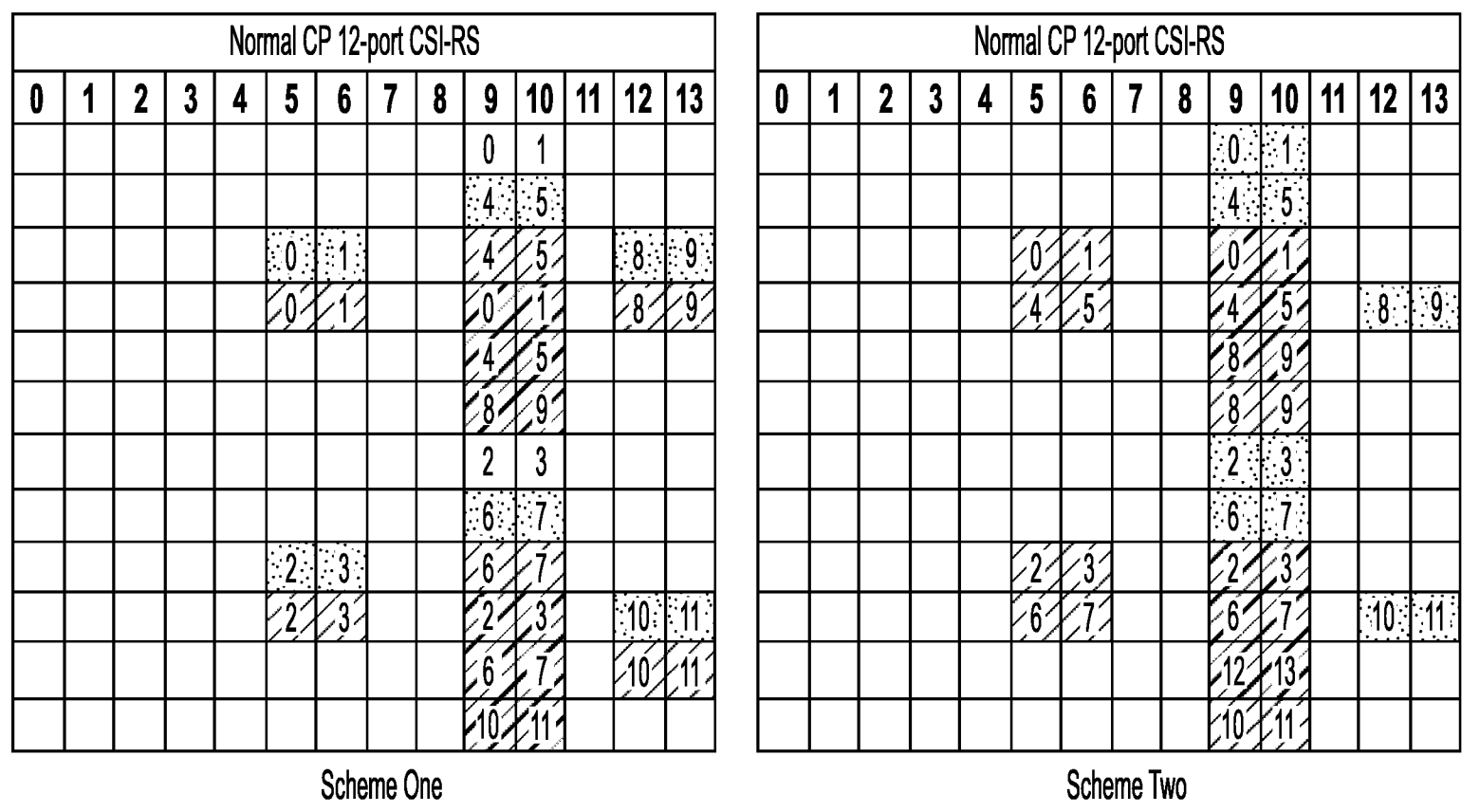
Figure 10B:
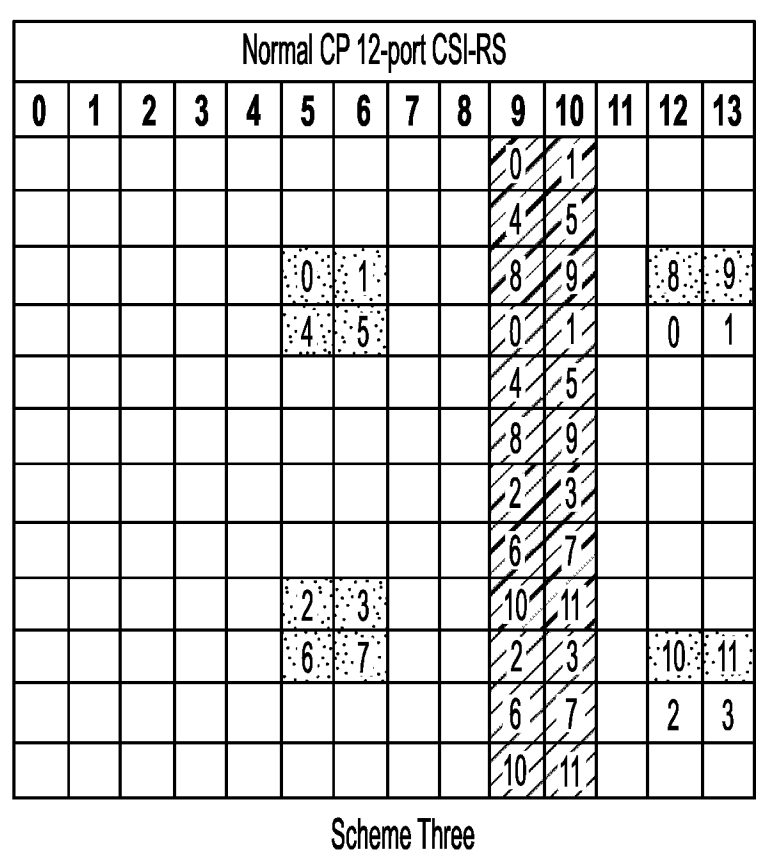

In addition, 12 antenna ports may be used for transmitting CSI-RS. FIGS. 10A and 10B show examples of three schemes of a CSI-RS pattern with a normal cyclic prefix in a case that the number of antenna ports is 12. In the three schemes, the CSI-RS pattern is based on a single PRB, and 36 resource elements of 40 existing resource elements for CSI-RS are used, resulting in CSI-RS configurations (which are filled with gray, black dots and oblique lines respectively) with a multiplexing factor of 3. Regarding the multiplexing manner, time-domain code division multiplexing with the length of 2 in the Rel 10 is used for odd-numbered ports and even-numbered ports. It may be seen that, the CSI-RS pattern may be obtained by combining three CSI-RS configurations for four ports, or combining one CSI-RS configuration for eight ports and one CSI-RS configuration for four ports, in a case that the number of antenna ports is 12.

In the scheme one, parameters in a mapping equation (2) for mapping reference signal sequences to complex value symbols are set as follows:

$$k = k' + 12m + \begin{cases} -0 & p \in \{15, 16, 23, 24\}, \ CSI\text{-}RS \text{ configuration } 0, 1 \\ -6 & p \in \{17, 18, 25, 26\}, \ CSI\text{-}RS \text{ configuration } 0, 1 \\ +1 & p \in \{19, 20\}, \ CSI\text{-}RS \text{ configuration } 0, 1 \\ -5 & p \in \{21, 22\}, \ CSI\text{-}RS \text{ configuration } 0, 1 \\ -0 & p \in \{15, 16\}, \ CSI\text{-}RS \text{ configuration } 2 \\ -6 & p \in \{17, 18\}, \ CSI\text{-}RS \text{ configuration } 2 \\ -1 & p \in \{19, 20\}, \ CSI\text{-}RS \text{ configuration } 2 \\ -7 & p \in \{21, 22\}, \ CSI\text{-}RS \text{ configuration } 2 \\ -2 & p \in \{23, 24\}, \ CSI\text{-}RS \text{ configuration } 2 \\ -8 & p \in \{25, 26\}, \ CSI\text{-}RS \text{ configuration } 2 \end{cases}$$

$$l = l' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

$$l'' = \begin{cases} 0, 1, 3, 4 & n_s \bmod 2 = 1, \ CSI\text{-}RS \text{ configuration } 0, 1 \\ 0, 1 & \text{in other cases} \end{cases}$$

$$w_{l''} = \begin{cases} 1 & p \in \{15, 17, 19, 21, 23, 25\} \\ (-1)^{l''} & p \in \{16, 18, 20, 22, 24, 26\} \end{cases}$$

where CSI-RS configuration 0 corresponds to resource elements filled with black dots. CSI-RS configuration 1 corresponds to resource elements filled with gray, and CSI-RS configuration 2 corresponds to resource elements filled with oblique lines. A mapping relationship between CSI-RS configurations and (k', l') may be obtained from Table 5 as follows.

TABLE 5

|  | (k', l') | $n_s$ mod 2 |
|---|---|---|
| CSI-RS configuration 0 | (9, 5)/(10, 2) | 0/1 |
| CSI-RS configuration 1 | (8, 5)/(9, 2) | 0/1 |
| CSI-RS configuration 2 | (8, 2) | 1 |

In the scheme two, parameters in a mapping equation (2) for mapping reference signal sequences to complex value symbols are set as follows:

$$k = k' + 12m + \begin{cases} -0 & p \in \{15, 16\}, \textit{CSI-RS} \text{ configuration } 0, 1 \\ -6 & p \in \{17, 18\}, \textit{CSI-RS} \text{ configuration } 0, 1 \\ -1 & p \in \{19, 20\}, \textit{CSI-RS} \text{ configuration } 0, 1 \\ -7 & p \in \{21, 22\}, \textit{CSI-RS} \text{ configuration } 0, 1 \\ -3 & p \in \{23, 24\}, \textit{CSI-RS} \text{ configuration } 0, 1 \\ -9 & p \in \{25, 26\}, \textit{CSI-RS} \text{ configuration } 0, 1 \\ -0 & p \in \{15, 16\}, \textit{CSI-RS} \text{ configuration } 2 \\ -6 & p \in \{17, 18\}, \textit{CSI-RS} \text{ configuration } 2 \\ -1 & p \in \{19, 20\}, \textit{CSI-RS} \text{ configuration } 2 \\ -7 & p \in \{21, 22\}, \textit{CSI-RS} \text{ configuration } 2 \\ -2 & p \in \{23, 24\}, \textit{CSI-RS} \text{ configuration } 2 \\ -8 & p \in \{25, 26\}, \textit{CSI-RS} \text{ configuration } 2 \end{cases}$$

$$l = l' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

$$l'' = \begin{cases} 0, 1, 3, 4 & n_s \bmod 2 = 1, \textit{CSI-RS} \text{ configuration } 1 \\ 0, 1 & \text{in other cases} \end{cases}$$

$$w_{l''} = \begin{cases} 1 & p \in \{15, 17, 19, 21, 23, 25\} \\ (-1)^{l''} & p \in \{16, 18, 20, 22, 24, 26\} \end{cases}$$

where CSI-RS configuration 0 corresponds to resource elements filled with gray, CSI-RS configuration 1 corresponds to resource elements filled with black dots, and CSI-RS configuration 2 corresponds to resource elements filled with oblique lines. A mapping relationship between CSI-RS configurations and (k', l') may be obtained from Table 6 as follows.

TABLE 6

|  | (k', l') | $n_s$ mod 2 |
|---|---|---|
| CSI-RS configuration 0 | (9, 5)/(6, 2) | 0/1 |
| CSI-RS configuration 1 | (11, 2) | 1 |
| CSI-RS configuration 2 | (9, 2) | 1 |

In the scheme three, parameters in a mapping equation (2) for mapping reference signal sequences to complex value symbols are set as follows:

$$k = k' + 12m + \begin{cases} -0 & p \in \{15, 16, 23, 24\}, \textit{CSI-RS} \text{ configuration } 0 \\ -6 & p \in \{17, 18, 25, 26\}, \textit{CSI-RS} \text{ configuration } 0 \\ -1 & p \in \{19, 20\}, \textit{CSI-RS} \text{ configuration } 0 \\ -7 & p \in \{21, 22\}, \textit{CSI-RS} \text{ configuration } 0 \\ -0 & p \in \{15, 16\}, \textit{CSI-RS} \text{ configuration } 1, 2 \\ -6 & p \in \{17, 18\}, \textit{CSI-RS} \text{ configuration } 1, 2 \\ -1 & p \in \{19, 20\}, \textit{CSI-RS} \text{ configuration } 1, 2 \\ -7 & p \in \{21, 22\}, \textit{CSI-RS} \text{ configuration } 1, 2 \\ -2 & p \in \{23, 24\}, \textit{CSI-RS} \text{ configuration } 1, 2 \\ -8 & p \in \{25, 26\}, \textit{CSI-RS} \text{ configuration } 1, 2 \end{cases}$$

$$l = l' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

$$l'' = 0, 1$$

$$w_{l''} = \begin{cases} 1 & p \in \{15, 17, 19, 21, 23, 25\} \\ (-1)^{l''} & p \in \{16, 18, 20, 22, 24, 26\} \end{cases}$$

where CSI-RS configuration 0 corresponds to resource elements filled with black dots, CSI-RS configuration 1 corresponds to resource elements filled with oblique lines, and CSI-RS configuration 2 corresponds to resource elements filled with gray. A mapping relationship between CSI-RS configurations and (k', l') may be obtained from Table 7 as follows:

TABLE 7

|  | (k', l') | $n_s$ mod 2 |
|---|---|---|
| CSI-RS configuration 0 | (9, 5) | 0/1 |
| CSI-RS configuration1 | (11, 2) | 1 |
| CSI-RS configuration 2 | (8, 2) | 1 |

Examples of the CSI-RS pattern for the FDD frame with normal cyclic prefix are described above, and examples of the CSI-RS pattern for the FDD frame with an extended cyclic prefix are given below.

Figure 11:
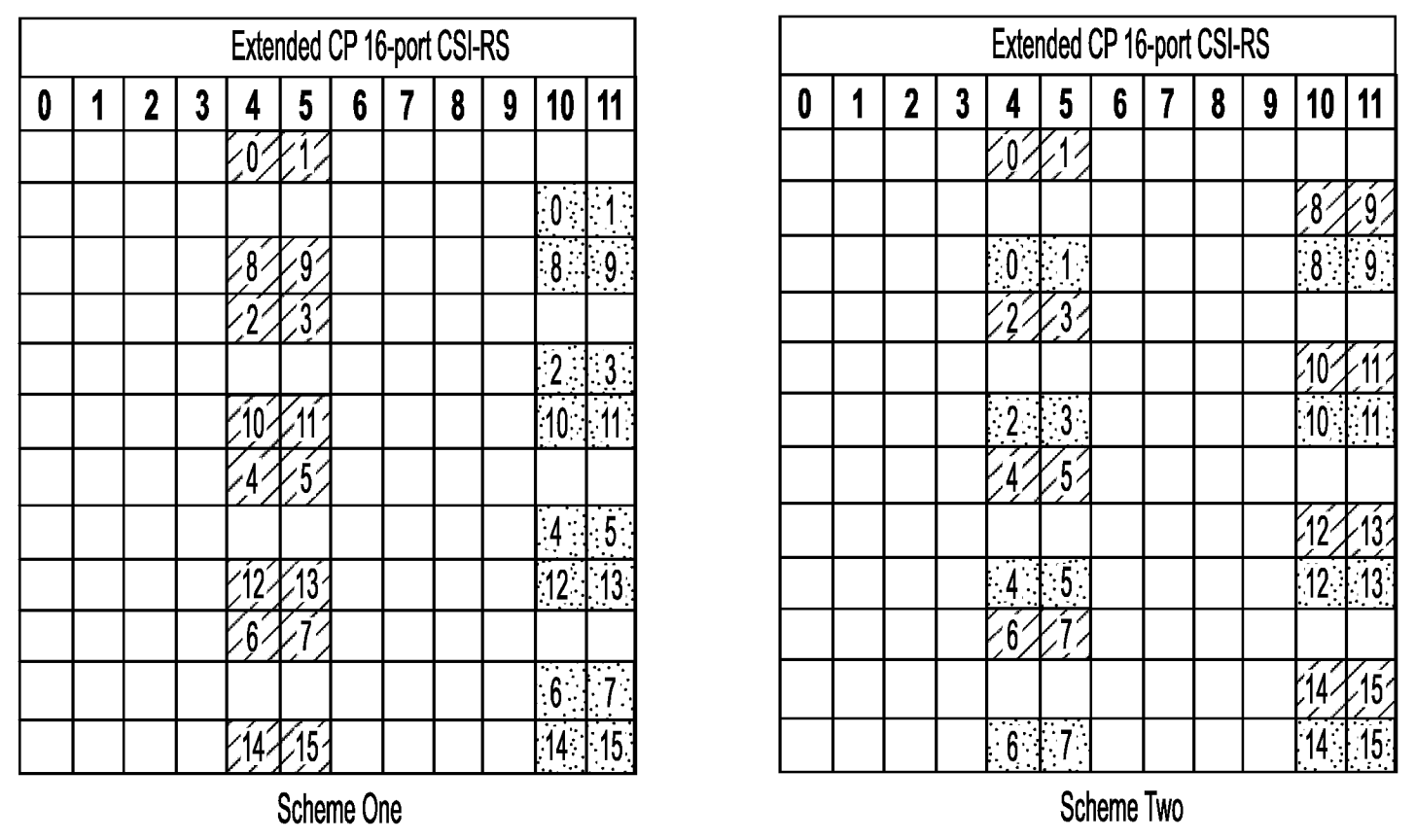

FIG. 11 show examples of two schemes of a CSI-RS pattern for an FDD frame with an extended cyclic prefix in a case that the number of antenna ports is 16. In FIG. 11, the resource elements filled with gray and the resource elements filled with black dots each represent one optional CSI-RS configuration, respectively. Multiplexing factors of the two schemes are each 2. The same as the above description, sets of ports for code division multiplexing are ports {0, 1, 8, 9}, ports {4, 5, 12, 13}, ports {2, 3, 10, 11} and ports {6, 7, 14, 15}. In the two schemes, a hybrid time-domain code division multiplexing with the length of 2 and frequency-domain code division multiplexing with the length of 2 are used. In schemes shown in FIG. 11, no additional resource elements for transmitting CSI-RS are added as compared with a case that there are eight ports.

Figure 12:
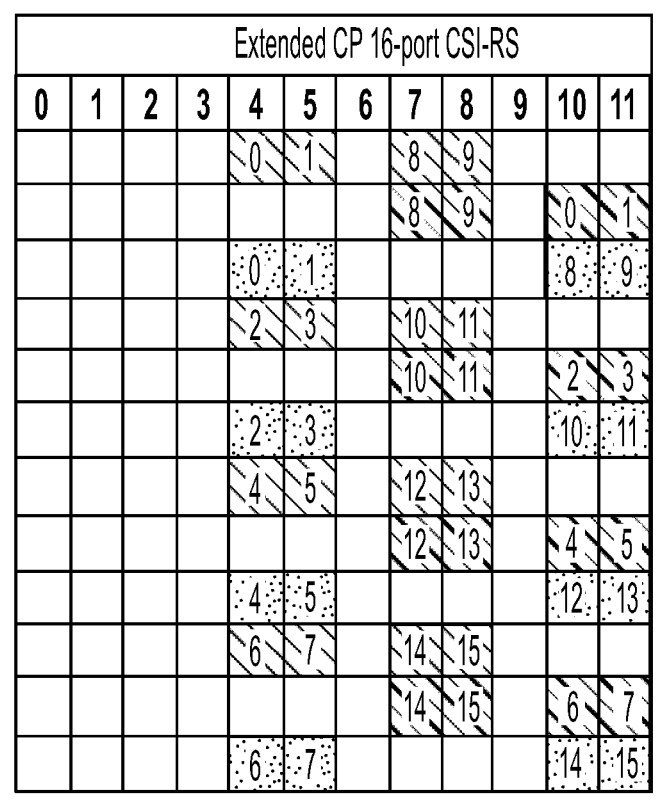

FIG. 12 shows an example of another scheme of a CSI-RS pattern for an FDD frame with an extended cyclic prefix in a case that the number of antenna ports is 16. In the scheme, 16 resource elements in a seventh OFDM symbol and in an eighth OFDM symbol are newly added for transmitting CSI-RS. The scheme has a same configuration as that in FIG. 11. The scheme includes three sets of CSI-RS configurations (which are filled with gray, black dots and oblique lines, respectively), and a multiplexing factor is 3. However, in the scheme, time-domain coding division multiplexing with the length of 4 is used.

In addition, similarly, a CSI-RS pattern based two adjacent sub-frames may also be used. A CSI-RS pattern in each of the sub-frames corresponds to the CSI-RS pattern for eight ports. For example, ports 0 to 7 are located in a sub-frame m, and ports 8 to 15 are located in a sub-frame m+1. In a case that there are more antenna ports such as 32 antenna ports, for example, the pattern in FIG. 11 or FIG. 12 may be extended in adjacent sub-frames, which is not described in detail anymore.

Figure 13:
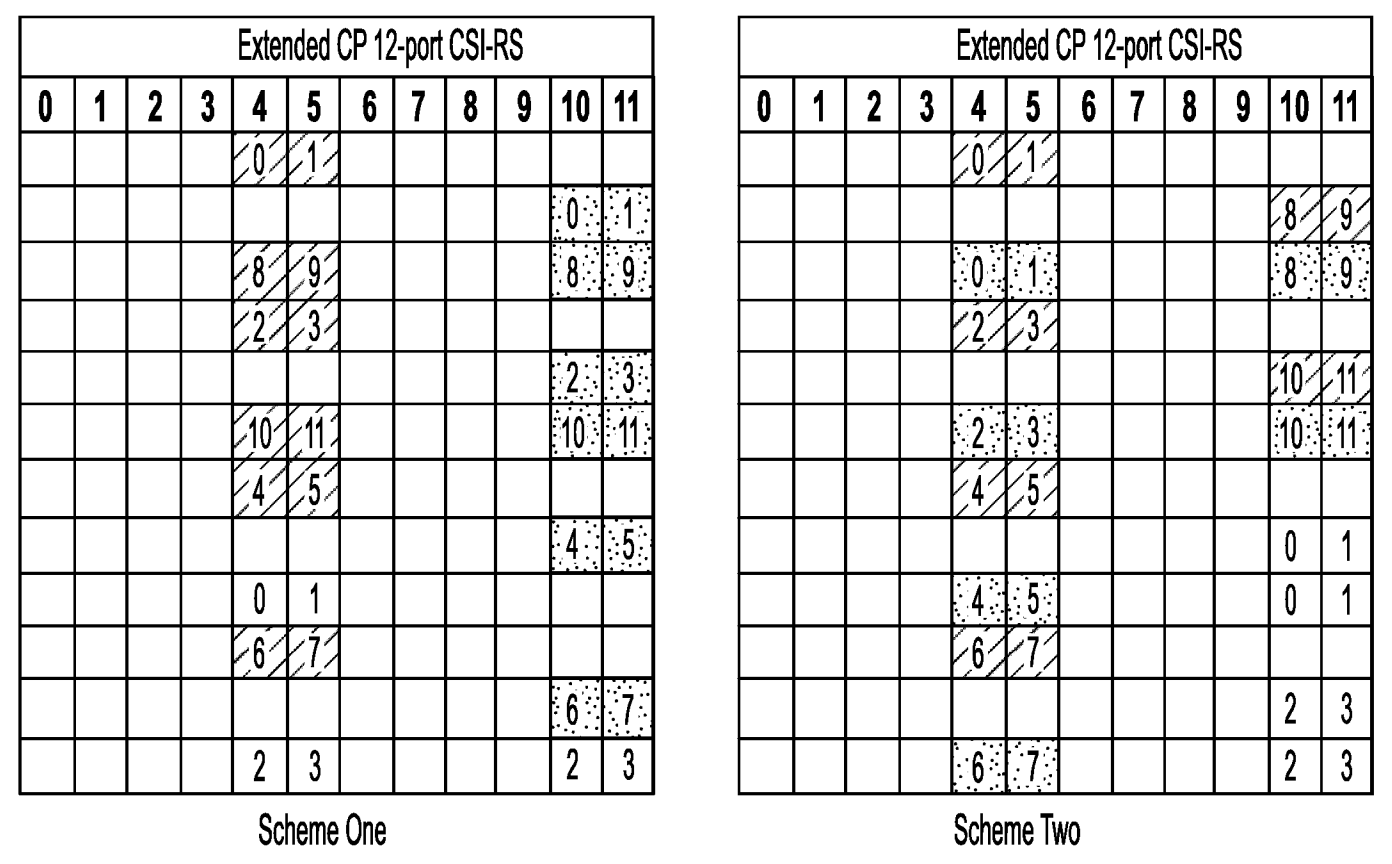

FIG. 13 shows examples of two schemes of a CSI-RS pattern for an FDD frame with an extended cyclic prefix in a case that the number of antenna ports is 12. In the scheme shown in FIG. 13, the CSI-RS pattern is based on CSI-RS configurations (which are filled with gray and black dots, respectively) with a multiplexing factor of 2 and based on a single PRB. Similar to the case of the normal cyclic prefix, a multiplexing manner of time-domain code division multiplexing with the length of 2 is used for odd-numbered ports and even-numbered ports. The CSI-RS pattern may be obtained by combining three CSI-RS configurations for four ports or combining one CSI-RS configuration for eight ports and one CSI-RS configuration for four ports.

In the scheme one shown in FIG. 11 and FIG. 13, parameters in the mapping equation (2) for mapping reference signal sequences to complex value symbols are set as follows.

$$k = k' + 12m + \begin{cases} 0 & p \in \{15, 16\}, \textit{CSI-RS}\ \text{configuration}\ 0 \\ -3 & p \in \{17, 18\}, \textit{CSI-RS}\ \text{configuration}\ 0 \\ -6 & p \in \{19, 20\}, \textit{CSI-RS}\ \text{configuration}\ 0 \\ -9 & p \in \{21, 22\}, \textit{CSI-RS}\ \text{configuration}\ 0 \\ -1 & p \in \{23, 24\}, \textit{CSI-RS}\ \text{configuration}\ 0 \\ -4 & p \in \{25, 26\}, \textit{CSI-RS}\ \text{configuration}\ 0 \\ -7 & p \in \{27, 28\}, \textit{CSI-RS}\ \text{configuration}\ 0 \\ -10 & p \in \{29, 30\}, \textit{CSI-RS}\ \text{configuration}\ 0 \\ 0 & p \in \{15, 16, 23, 24\}, \textit{CSI-RS}\ \text{configuration}\ 1 \\ -3 & p \in \{17, 18, 25, 26\}, \textit{CSI-RS}\ \text{configuration}\ 1 \\ -6 & p \in \{19, 20, 27, 28\}, \textit{CSI-RS}\ \text{configuration}\ 1 \\ -9 & p \in \{21, 22, 29, 30\}, \textit{CSI-RS}\ \text{configuration}\ 1 \end{cases}$$

$$l = l' + l'', l'' + 6$$
$$m = 0, 1, \ldots, N_{RB}^{DL} - 1$$
$$m' = m + \left\lfloor \frac{N_{RB}^{max,DL} - N_{RB}^{DL}}{2} \right\rfloor$$
$$l'' = 0, 1$$

where in a case that the number of antenna ports is 16, CSI-RS configuration 0 corresponds to resource elements filled with gray, and CSI-RS configuration 1 corresponds to resource elements filled with black dots. A value of the sequence w=$w_p(i)$ may be obtained from Table 8 as follows.

TABLE 8

| Antenna port P | [$w_p(0)\ w_p(1)\ w_p(2)\ w_p(3)$] |
| --- | --- |
| 15/17/19/21 | [+1 +1 +1 +1] |
| 16/18/20/22 | [+1 −1 +1 −1] |
| 23/25/27/29 | [+1 +1 −1 −1] |
| 24/26/28/30 | [+1 −1 −1 +1] |

In a case that the number of antenna ports is 12, CSI-RS configuration 0 corresponds to resource elements filled with black dots, and CSI-RS configuration 1 corresponds to resource elements filled with gray, and the sequence w=$w_{l''}$ may be represented as:

$$w_{l''} = \begin{cases} 1 & p \in \{15, 17, 19, 21, 23, 25\} \\ (-1)^{l''} & p \in \{16, 18, 20, 22, 24, 26\} \end{cases}$$

A mapping relationship between CSI-RS configurations and (k', l') may be obtained from Table 9 as follows.

TABLE 9

|  | (k', l') | $n_s$ mod 2 |
| --- | --- | --- |
| CSI-RS configuration 0 | (11, 4) | 0 |
| CSI-RS configuration 1 | (10, 4) | 1 |

In the scheme two shown in FIG. 11 and FIG. 13, parameters in the mapping equation (2) for mapping reference signal sequences to complex value symbols are set as follows.

$$k = k' + 12m + \begin{cases} -0 & p \in \{15, 16\}, \textit{CSI-RS}\ \text{configuration}\ 0 \\ -3 & p \in \{17, 18\}, \textit{CSI-RS}\ \text{configuration}\ 0 \\ -6 & p \in \{19, 20\}, \textit{CSI-RS}\ \text{configuration}\ 0 \\ -9 & p \in \{21, 22\}, \textit{CSI-RS}\ \text{configuration}\ 0 \\ -1 & p \in \{23, 24\}, \textit{CSI-RS}\ \text{configuration}\ 0 \\ -4 & p \in \{25, 26\}, \textit{CSI-RS}\ \text{configuration}\ 0 \\ -7 & p \in \{27, 28\}, \textit{CSI-RS}\ \text{configuration}\ 0 \\ -10 & p \in \{29, 30\}, \textit{CSI-RS}\ \text{configuration}\ 0 \\ -0 & p \in \{15, 16, 23, 24\}, \textit{CSI-RS}\ \text{configuration}\ 1 \\ -3 & p \in \{17, 18, 25, 26\}, \textit{CSI-RS}\ \text{configuration}\ 1 \\ -6 & p \in \{19, 20, 27, 28\}, \textit{CSI-RS}\ \text{configuration}\ 1 \\ -9 & p \in \{21, 22, 29, 30\}, \textit{CSI-RS}\ \text{configuration}\ 1 \end{cases}$$

$$l = l' + l''$$
$$m = 0, 1, \ldots, N_{RB}^{DL} - 1$$
$$m' = m + \left\lfloor \frac{N_{RB}^{max,DL} - N_{RB}^{DL}}{2} \right\rfloor$$
$$l'' = 0, 1$$

In a case that the number of antenna ports is 16, CSI-RS configuration 0 corresponds to resource elements filled with gray, and CSI-RS configuration 1 corresponds to resource elements filled with black dots, and the sequence w=$w_p$ may be obtained from Table 10 as follows.

TABLE 10

| Antenna Port P | [$w_p(0)$ $w_p(1)$ $w_p(2)$ $w_p(3)$] |
|---|---|
| 15/17/19/21 | [+1 +1 +1 +1] |
| 16/18/20/22 | [+1 −1 +1 −1] |
| 23/25/27/29 | [+1 +1 −1 −1] |
| 24/26/28/30 | [+1 −1 −1 +1] |

In a case that the number of antenna ports is 12, CSI-RS configuration 0 corresponds to resource elements filled with gray, and CSI-RS configuration 1 corresponds to resource elements filled with black dots, and the sequence $w=w_p$ may be represented as follows.

$$w_{l''} = \begin{cases} 1 & p \in \{15, 17, 19, 21, 23, 25\} \\ (-1)^{l''} & p \in \{16, 18, 20, 22, 24, 26\} \end{cases}$$

A mapping relationship between CSI-RS configurations and (k', l') may be obtained from Table 11 as follows.

TABLE 11

| | (k', l') | $n_s$ mod 2 |
|---|---|---|
| CSI-RS configuration 0 | (11, 4)/(10, 4) | 0/1 |
| CSI-RS configuration 1 | (9, 4) | 0/1 |

Examples of the CSI-RS pattern in a case that different numbers of antenna ports are used for transmitting CSI-RS in an FDD mode is given above. Examples of the CSI-RS pattern for different numbers of antenna ports in a TDD mode are given below in a similar manner.

FIG. 14 shows an example of a scheme of a CSI-RS pattern for a TDD frame with a normal cyclic prefix in a case that the number of antenna ports is 16. In the scheme, as compared with an existing CSI-RS pattern, no new resource element is added additionally. Since the number of CSI-RS resource elements in a TDD frame with a normal cyclic prefix in the R10 is 24, there is only one configuration (which is filled with gray) in a case that CSI-RS at 16 ports are configured in only one PRB, and a multiplexing factor is 1. Sets of ports for code division multiplexing are ports {0, 1, 4, 5}, ports {8, 9, 12, 13}, ports {2, 3, 6, 7} and ports {10, 11, 14, 15}. In the CSI-RS configuration, hybrid time-domain code division multiplexing and frequency-domain coding division multiplexing is used.

FIG. 15 shows an example of a scheme of a CSI-RS pattern for a TDD frame with a normal cyclic prefix in a case that the number of antenna ports is 12. In the scheme, there are two sets of CSI-RS configurations, which are filled with gray and black dots respectively, and therefore, a multiplexing factor is 2. A multiplexing manner of time-domain code division multiplexing with the length of 2 is used for even-numbered ports and odd-numbered ports. The CSI-RS pattern may be obtained by combining three CSI-RS configurations for four ports or combining one CSI-RS configuration for eight ports and one CSI-RS configuration for four ports.

In the schemes shown in FIG. 14 and FIG. 15, parameters in the mapping equation (2) for mapping reference signal sequences to complex value symbols are set as follows.

$$k = k' + 12m + \begin{cases} -0 & p \in \{15, 16\} \\ -6 & p \in \{17, 18\} \\ -1 & p \in \{19, 20\} \\ -7 & p \in \{21, 22\} \\ -2 & p \in \{23, 24\} \\ -8 & p \in \{25, 26\} \\ -3 & p \in \{27, 28\} \\ -9 & p \in \{29, 30\} \end{cases}$$

$$l = l' + 2l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

$$l'' = 0, 1$$

where in a case that the number of antenna ports is 16, the CSI-RS configuration serves as CSI-RS configuration 0. A value of the sequence $w=w_p(i)$ may be obtained from Table 12 as follows.

TABLE 12

| Antenna Port P | [$w_p(0)$ $w_p(1)$ $w_p(2)$ $w_p(3)$] |
|---|---|
| 15/17/23/25 | [+1 +1 +1 +1] |
| 16/18/24/26 | [+1 −1 +1 −1] |
| 19/21/27/29 | [+1 +1 −1 −1] |
| 20/22/28/30 | [+1 −1 −1 +1] |

In a case that the number of antenna ports is 12, CSI-RS configuration 0 corresponds to resource elements filled with gray, and CSI-RS configuration 1 corresponds to resource elements filled with black dots, and a sequence $w=w_p$ may be represented as follows.

$$w_{l''} = \begin{cases} 1 & p \in \{15, 17, 19, 21, 23, 25\} \\ (-1)^{l''} & p \in \{16, 18, 20, 22, 24, 26\} \end{cases}$$

A mapping relationship between CSI-RS configurations and (k', l') may be obtained from Table 13 as follows.

TABLE 13

| | (k', l') | $n_s$ mod 2 |
|---|---|---|
| CSI-RS configuration 0 | (11, 1) | 1 |
| CSI-RS configuration 1 (only for 12 ports) | (8, 1) | 1 |

Figure 16:
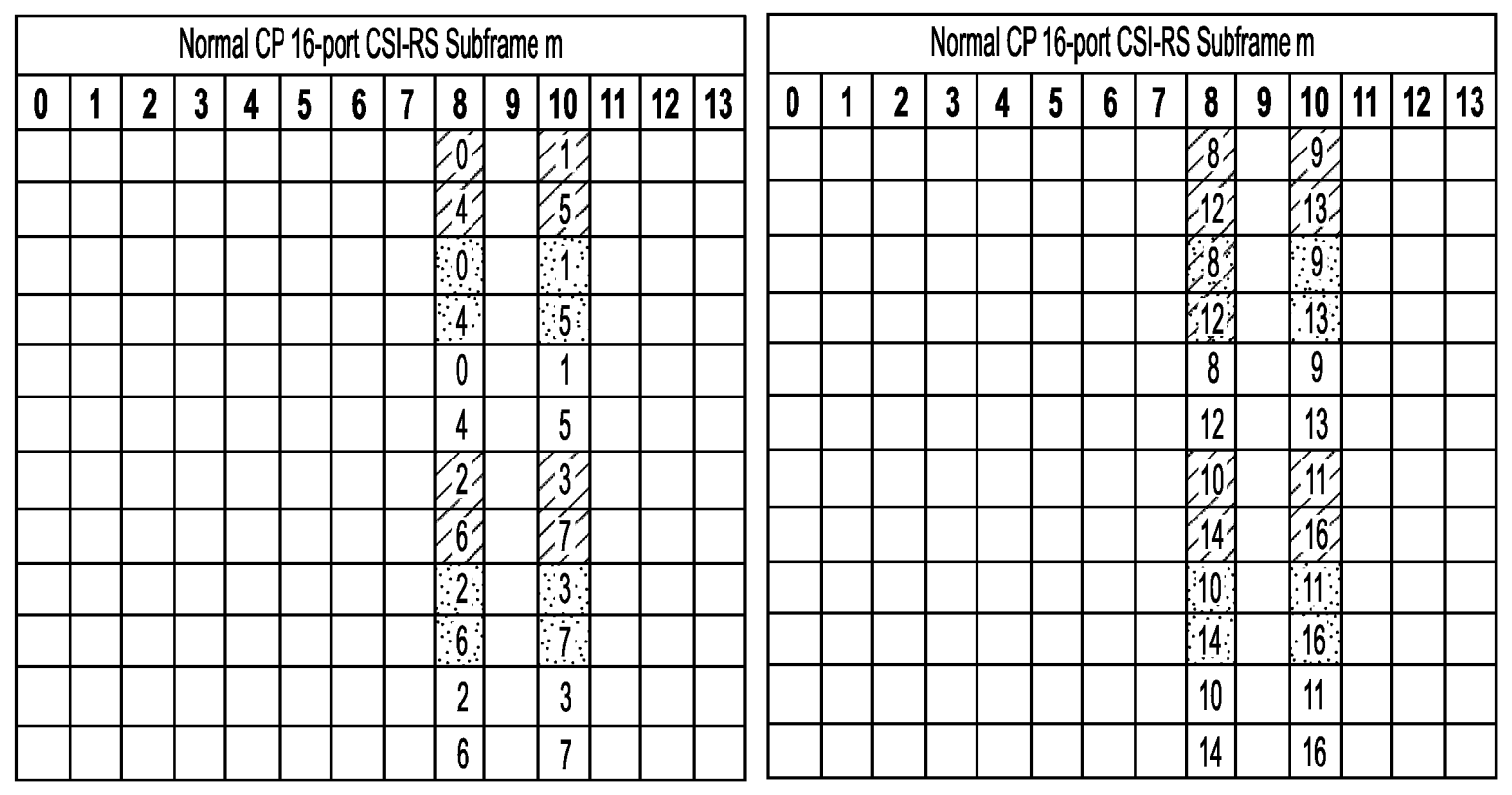

In addition, a CSI-RS pattern may be configured in two adjacent sub-frames. FIG. 16 shows a CSI-RS pattern for a TDD frame with a normal CP based on two adjacent sub-frames in a case that the number of ports is 16. The pattern is composed of a CSI-RS pattern for eight ports in each of two different sub-frames. Ports 0 to 7 are located in a sub-frame m, and ports 8 to 15 are located in a sub-frame m+1. There are three sets of CSI-RS configurations (which are filled with white, gray and black dots, respectively), a multiplexing factor is 3, and a density of CSI-RS is 0.5/RE/port/PBR. A multiplexing manner of hybrid time-domain coding division multiplexing with the length of 2 and frequency-domain coding division multiplexing with the length of 2 is used.

In a case that there are 32 ports, a CSI-RS pattern based on 16 ports such as the CSI-RS pattern shown in FIG. 14 is extended in two adjacent sub-frames to obtain a CSI-RS pattern. Also, a CSI-RS pattern for more antenna ports such as 64 ports may be further obtained by similar extension.

Figure 17:
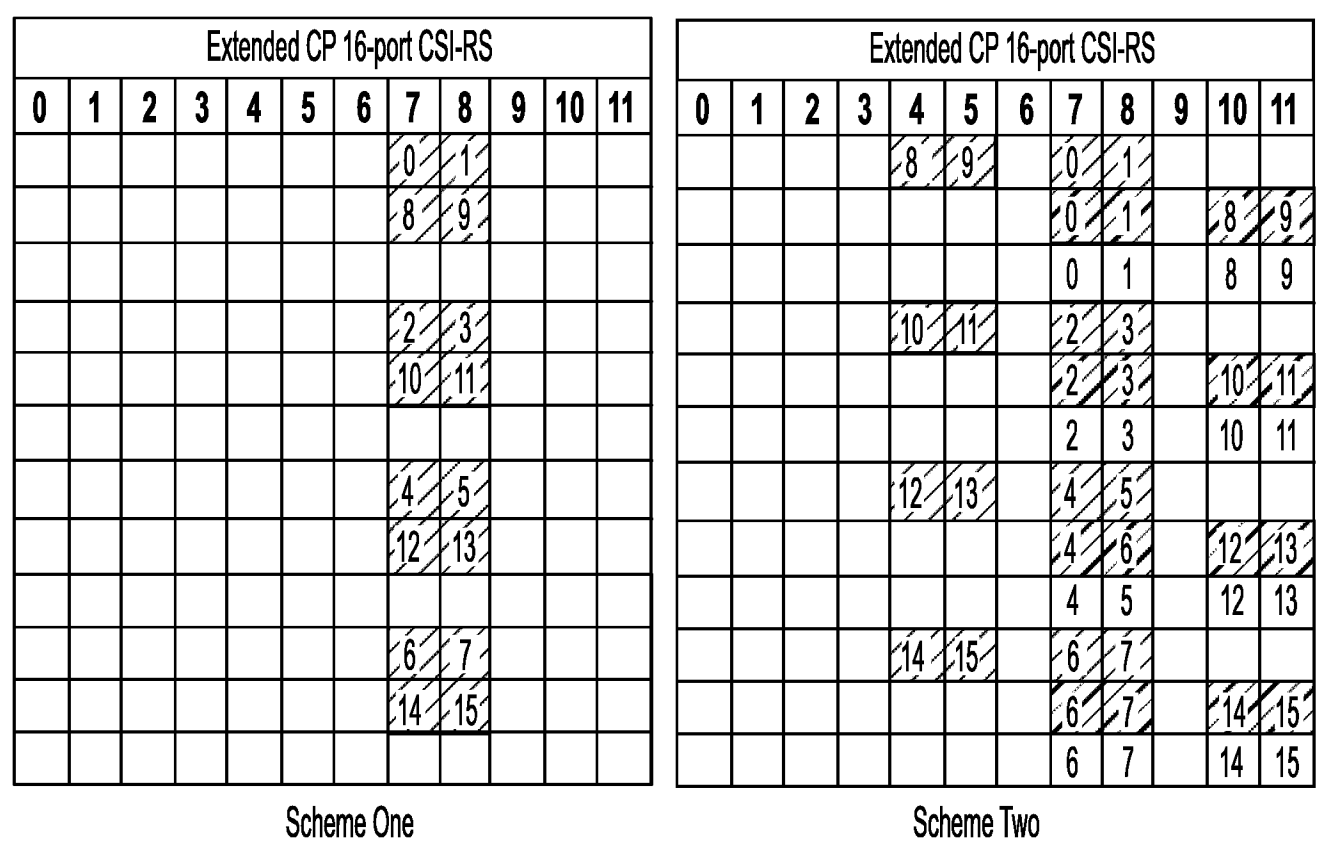

FIG. 17 shows examples of two schemes of a CSI-RS pattern for a TDD frame with an extended cyclic prefix in a case that the number of antenna ports is 16. In the scheme one, sets of ports for code division multiplexing are ports {0, 1, 8, 9}, ports {4, 5, 12, 13}, ports {2, 3, 10, 11} and ports {6, 7, 14, 15}. As compared with the existing CSI-RS pattern, no new resource element is added in the scheme. The scheme includes only one set of configuration (which is filled with gray), and a multiplexing factor is 1. In the CSI-RS configuration, hybrid frequency-domain code division multiplexing and time-domain code division multiplexing is used.

In the scheme two, 24 additional resource elements are added in a fifth OFDM symbol, a sixth OFDM symbol, a tenth OFDM symbol and an eleventh OFDM symbol for transmitting CSI-RS. The scheme includes three sets of CSI-RS configurations, which are filled with white, gray and oblique lines, respectively, and therefore a multiplexing factor is 3. The same as the scheme one, hybrid frequency-domain code division multiplexing and time-domain code division multiplexing is used for the sets of ports for code division multiplexing, that is, four ports share four resource elements corresponding to the four ports. Since four REs are available for the CSI-RS in each OFDM symbol, a power gain of the CSI-RS is 6 dB.

In the scheme one shown in FIG. 17, parameters in the mapping equation (2) for mapping reference signal sequences to complex value symbols are set as follows.

$$k = k' + 12m + \begin{cases} -0 & p \in \{15, 16\} \\ -3 & p \in \{17, 18\} \\ -6 & p \in \{19, 20\} \\ -9 & p \in \{21, 22\} \\ -1 & p \in \{23, 24\} \\ -4 & p \in \{25, 26\} \\ -7 & p \in \{27, 28\} \\ -10 & p \in \{29, 30\} \end{cases}$$

$$l = l' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

$$l'' = 0, 1$$

where CSI-RS configuration serves as CSI-RS configuration 0. A value of the sequence $w_p(i)$ may be obtained from Table 14 as follows.

TABLE 14

| Antenna Port P | [$w_p(0)$ $w_p(1)$ $w_p(2)$ $w_p(3)$] |
| --- | --- |
| 15/17/19/21 | [+1 +1 +1 +1] |
| 16/18/20/22 | [+1 −1 +1 −1] |
| 23/25/27/29 | [+1 +1 −1 −1] |
| 24/26/28/30 | [+1 −1 −1 +1] |

A mapping relationship between CSI-RS configurations and (k', l') may be obtained from Table 15 as follows.

TABLE 15

|  | (k', l') | $n_s$ mod 2 |
| --- | --- | --- |
| CSI-RS configuration 0 | (11, 1) | 1 |

In addition, in a case that the number of antenna ports is 16, a CSI-RS pattern for eight ports can be extended in two adjacent sub-frames to obtain a CSI-RS pattern. For example, ports 0 to 7 are located in a sub-frame m, and ports 8 to 15 are located in a sub-frame m+1. Furthermore, in a case that the number of antenna ports is 32, for example, one of the CSI-RS patterns for 16 ports shown in FIG. 17 may be extended in two adjacent sub-frames to obtain a CSI-RS pattern. For example, ports 0 to 15 are located in a sub-frame m, and ports 16 to 31 are located in a sub-frame m+1.

FIG. 18 shows an example of a scheme of a CSI-RS pattern for a TDD frame with an extended cyclic prefix in a case that the number of antenna ports is 12. The scheme includes two configurations, which are filled with gray and black dots, respectively, and therefore, a multiplexing factor is 2. A multiplexing manner of time-domain code division multiplexing with the length of 2 is used for even-numbered ports and odd-numbered ports. A CSI-RS pattern may be obtained by combining three CSI-RS configurations for four ports or combining one CSI-RS configuration for eight ports and one CSI-RS configuration for four ports.

In the scheme shown in FIG. 18, parameters in the mapping equation (2) for mapping reference signal sequences to complex value symbols are set as follows.

$$k = k' + 12m + \begin{cases} -0 & p \in \{15, 16\} \\ -3 & p \in \{17, 18\} \\ -1 & p \in \{19, 20\} \\ -4 & p \in \{21, 22\} \\ -2 & p \in \{23, 24\} \\ -5 & p \in \{25, 26\} \end{cases}$$

$$l = l' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

$$l'' = 0, 1$$

$$w_{l''} = \begin{cases} 1 & p \in \{15, 17, 19, 21, 23, 25\} \\ (-1)^{l''} & p \in \{16, 18, 20, 22, 24, 26\} \end{cases}$$

where CSI-RS configuration 0 corresponds to resource elements filled with gray, and CSI-RS configuration 1 corresponds to resource elements filled with black dots. A mapping relationship between CSI-RS configurations and (k', l') may be obtained from Table 16 as follows.

TABLE 16

|  | (k', l') | $n_s$ mod 2 |
| --- | --- | --- |
| CSI-RS configuration 0 | (11, 1) | 1 |
| CSI-RS configuration 1 | (5, 1) | 1 |

Figure 19A:
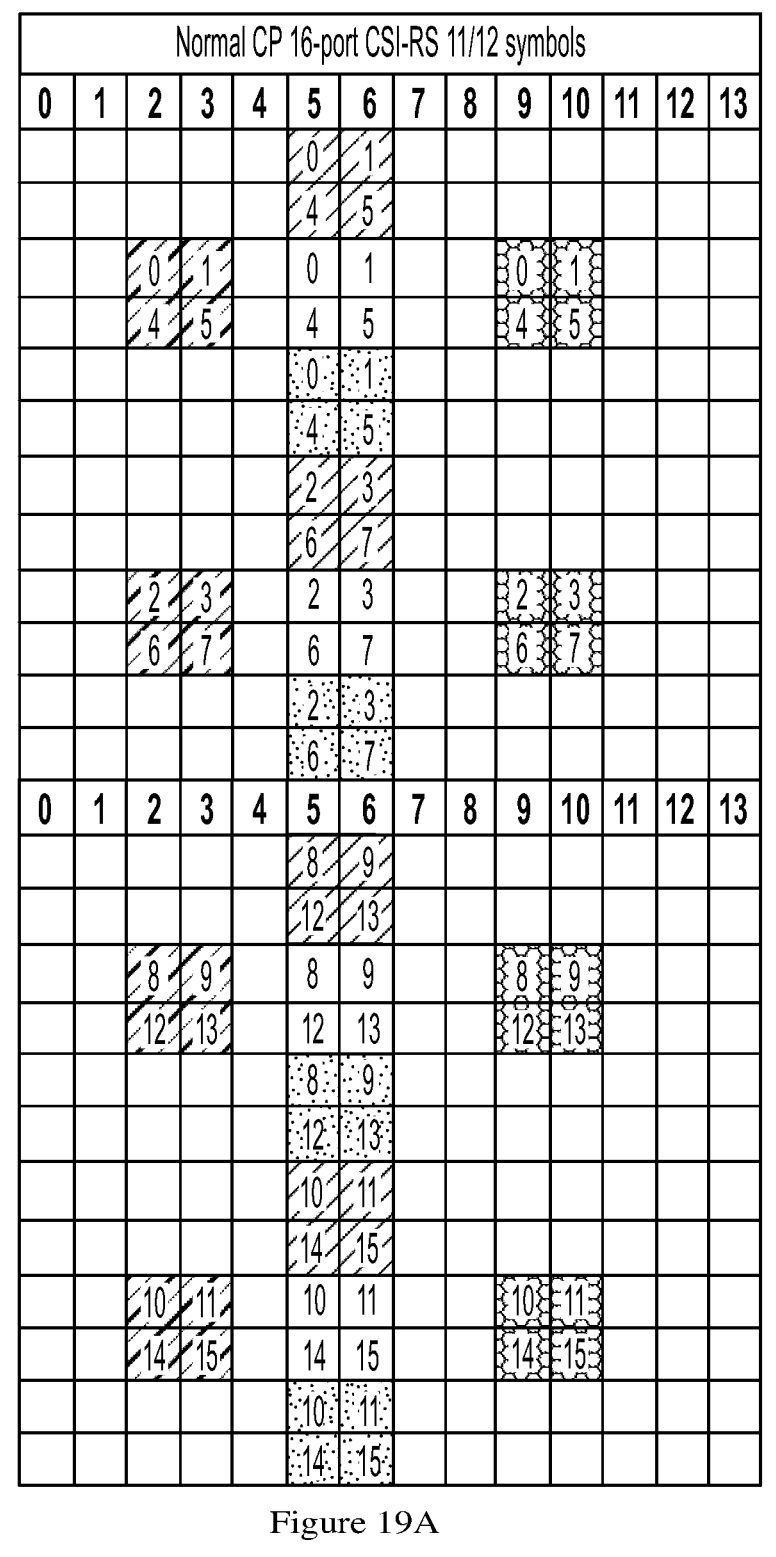
Figure 19B:
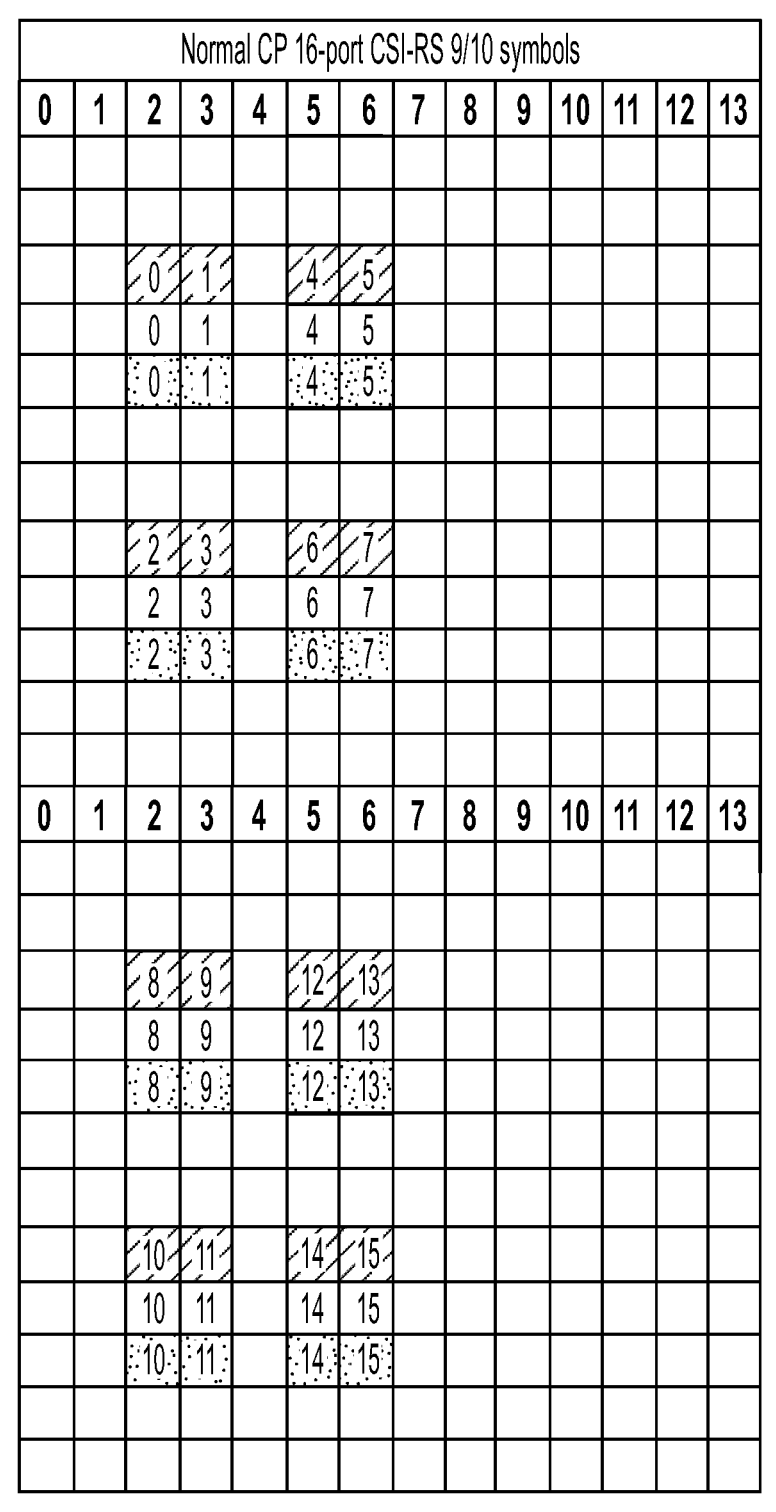

In addition, in a case that a TDD mode is used for wireless communications, the CSI-RS may be transmitted in a special sub-frame DwPTS. The CSI-RS pattern is a pattern based on two adjacent PRBs. FIGS. 19A and 19B show an example of a CSI-RS pattern for the special sub-frame DwPTS with a normal cyclic prefix in the TDD mode.

In FIG. 19A, the number of OFDM symbols occupied by the special sub-frame DwPTS is 11/12, and each of an upper part and a lower part represents one PRB. The CSI-RS pattern is composed of a CSI-RS pattern for eight ports in each of two adjacent different PRBs. Ports 0 to 7 for CSI-RS are located in a first PRB, and ports 8 to 15 for CSI-RS are located in a second PRB. A density of the CSI-RS is 0.5RE/port/PRB. A multiplexing manner of code division multiplexing with the length of 2 is used for even-numbered ports and odd-numbered ports, and frequency division multiplexing is used on a same symbol. Since four resource elements are available for the CSI-RS in each OFDM symbol, a power gain of the CSI-RS is 6 dB. The scheme includes five sets of CSI-RS configurations, and a multiplexing factor is 5.

In FIG. 19B, the number of OFDM symbols occupied by the special sub-frame DwPTS is 9/10, and each of an upper part and a lower part represents one PRB. The CSI-RS pattern is composed of a CSI-RS pattern for eight ports in each of two adjacent different PRBs. Code division multiplexing with the length of 4 is used for ports 10,1,4,51, ports {2,3,6,7}, ports {8,9,12,13} and ports {10,11,14,15}, that is, the four ports share two resource elements corresponding to the four ports. Since four resource elements are available for the CSI-RS in each OFDM symbol, a power gain of the CSI-RS is 3 dB. The scheme includes three sets of CSI-RS configurations, and a multiplexing factor is 3.

FIG. 20 shows an example of a CSI-RS pattern for the special frame DwPTS with an extended cyclic prefix extended in the TDD mode. The pattern is composed of a CSI-RS pattern for eight ports in each of two adjacent different PRBs. Ports 0 to 7 for CSI-RS are located in a first PRB, and ports 8 to 15 for CSI-RS are located in a second PRB. A density of CSI-RS is 0.5RE/port/PRB. A multiplexing manner of code division multiplexing with the length of 2 is used for even-numbered ports and odd-numbered ports, and frequency division multiplexing is used on a same symbol. Since four REs are available for the CSI-RS in each OFDM symbol, a power gain of the CSI-RS is 6 dB. A multiplexing factor for the CSI-RS is 4 in the scheme.

In the schemes in FIG. 19A, FIG. 19B, and FIG. 20, parameters in the mapping equation (2) for mapping reference signal sequences to complex value symbols are set as follows.

$$k = k' + 24m + \begin{cases} -0 & p \in \{15, 16\}, CSI\text{-}RS \text{ configuration } 3, 4, 8 \text{ or } 9, \text{ normal } CP \\ -6 & p \in \{17, 18\}, CSI\text{-}RS \text{ configuration } 3, 4, 8 \text{ or } 9, \text{ normal } CP \\ -1 & p \in \{19, 20\}, CSI\text{-}RS \text{ configuration } 3, 4, 8 \text{ or } 9, \text{ normal } CP \\ -7 & p \in \{21, 22\}, CSI\text{-}RS \text{ configuration } 3, 4, 8 \text{ or } 9, \text{ normal } CP \\ -0 & p \in \{15, 16, 19, 20\}, CSI\text{-}RS \text{ configuration } 1, 2, 6 \text{ or } 7, \text{ normal } CP \\ -5 & p \in \{17, 18, 21, 22\}, CSI\text{-}RS \text{ configuration } 1, 2, 6 \text{ or } 7, \text{ normal } CP \\ -0 & p \in \{15, 16\}, CSI\text{-}RS \text{ configuration } 1, 2, 3, 5 \text{ or } 6, \text{ extended } CP \\ -3 & p \in \{17, 18\}, CSI\text{-}RS \text{ configuration } 1, 2, 3, 5 \text{ or } 6, \text{ extended } CP \\ -6 & p \in \{19, 20\}, CSI\text{-}RS \text{ configuration } 1, 2, 3, 5 \text{ or } 6, \text{ extended } CP \\ -9 & p \in \{21, 22\}, CSI\text{-}RS \text{ configuration } 1, 2, 3, 5 \text{ or } 6, \text{ extended } CP \end{cases}$$

$$l = l' + l''$$

$$l'' = \begin{cases} 0, 1, 3, 4 & CSI\text{-}RS \text{ configuration } 1, 2, 6 \text{ or } 7, \text{ normal } CP \\ 0, 1 & \text{in other cases} \end{cases}$$

$$w = \begin{cases} w_p & CSI\text{-}RS \text{ configuration } 1, 2, 6 \text{ or } 7, \text{ normal } CP \\ w_{l''} & \text{in other cases} \end{cases}$$

$$w_{l''} = \begin{cases} 1 & p \in \{15, 17, 19, 21, 23, 25, 27, 29\} \\ (-1)^{l''} & p \in \{16, 18, 20, 22, 24, 26, 28, 30\} \end{cases}$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

A value of the sequence $w_p(i)$ may be obtained from Table 17 as follows.

TABLE 17

| Antenna Port P | [$w_p(0)$ $w_p(1)$ $w_p(2)$ $w_p(3)$] |
|---|---|
| 15/17/23/25 | [+1 +1 +1 +1] |
| 16/18/24/26 | [+1 −1 +1 −1] |
| 19/21/27/29 | [+1 +1 −1 −1] |
| 20/22/28/30 | [+1 −1 −1 +1] |

In the scheme shown in FIG. 19A, CSI-RS configuration 0 corresponds to resource elements filled with oblique lines, CSI-RS configuration 1 corresponds to resource elements filled with gray, CSI-RS configuration 2 corresponds to resource elements filled with white, CSI-RS configuration 3 corresponds to resource elements filled with black dots, and CSI-RS configuration 4 corresponds to resource elements filled with horizontal lines. In the scheme shown in 19B, CSI-RS configuration 5 corresponds to resource elements filled with gray, CSI-RS configuration 6 corresponds to resource elements filled with white, CSI-RS configuration 7 corresponds to resource elements filled with black dots. A mapping relationship between CSI-RS configurations and (k', l') may be obtained from Table 18 as follows.

TABLE 18

|  | (k', l') | $n_s \bmod 2$/nPRB mod 2 |
| --- | --- | --- |
| CSI-RS configuration 0 | (9, 2) | 0/0, 1 |
| CSI-RS configuration 1 | (11, 5) | 0/0, 1 |
| CSI-RS configuration 2 | (9, 5) | 0/0, 1 |
| CSI-RS configuration 3 | (7, 5) | 0/0, 1 |
| CSI-RS configuration 4 | (9, 2) | 1/0, 1 |
| CSI-RS configuration 5 | (9, 2) | 0/0, 1 |
| CSI-RS configuration 6 | (8, 2) | 0/0, 1 |
| CSI-RS configuration 7 | (7, 2) | 0/0, 1 |

In the scheme shown in FIG. 20, CSI-RS configuration 0 corresponds to resource elements filled with white, CSI-RS configuration 1 corresponds to resource elements filled with black dots, CSI-RS configuration 2 corresponds to resource elements filled with black, CSI-RS configuration 3 corresponds to resource elements filled with oblique lines. A mapping relationship between CSI-RS configurations and (k', l') may be obtained from Table 19 as follows.

TABLE 19

|  | (k', l') | $n_s \bmod 2$/nPRB mod 2 |
| --- | --- | --- |
| CSI-RS configuration 0 | (11, 2) | 0/0, 1 |
| CSI-RS configuration 1 | (10, 2) | 0/0, 1 |
| CSI-RS configuration 2 | (11, 4) | 0/0, 1 |
| CSI-RS configuration 3 | (9, 4) | 0/0, 1 |

In addition, as shown in a dashed line box in FIG. 1, the device 100 may further include: a notifying unit 103, configured to notify a user equipment of a parameter related to the CSI-RS through CSI-RS-Config in RRC signaling. For example, the parameter may include at least one of: the number of antenna ports, a mapping relationship between CSI-RS and physical resource elements, a sub-frame offset, a period of a CSI-RS, a transmission power of a CSI-RS. The CSI-RS-Config is an information element for configuring the CSI-RS. In a case that the number of antenna ports is increased, such as the number of antenna ports is 16 or 32, it is necessary to add a variable for supporting the corresponding number of antenna ports in the CSI-RS-Config.

It should be noted that, the CSI-RS is taken as an example for the above description, the reference signal pattern in the embodiment may also be applied to another reference signal, such as a demodulation reference signal (DMRS) or the like.

Second Embodiment

Figure 21:
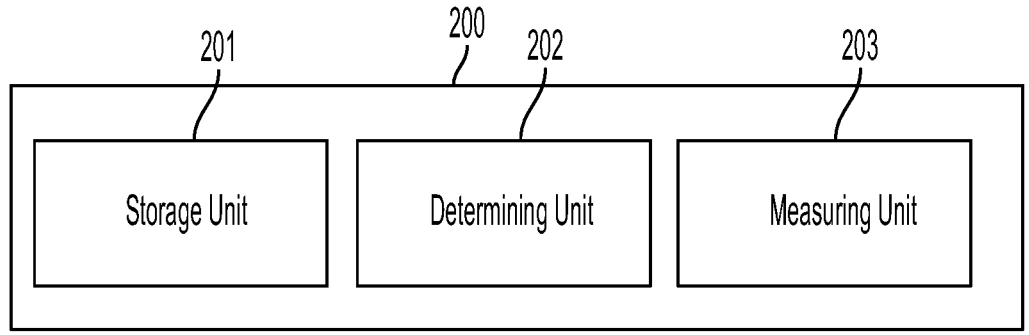
FIG. 21 is a structural block diagram showing a device 200 on a user equipment side for wireless communications according to an embodiment of the present disclosure.

FIG. 21 is a structural block diagram of a device 200 on a user equipment side for wireless communications according to an embodiment of the present disclosure, the device 200 includes: a storage unit 201, configured to store a reference signal pattern constituted by a mapping relationship between predetermined antenna ports and resource elements of physical transmission resources; a determining unit 202, configured to determine, based on the reference signal pattern and a parameter related to the reference signal from a base station side, physical resource elements corresponding to a current reference signal; and a measuring unit 203, configured to measure a reference signal on the determined physical resource elements, to report measured information to the base station side, wherein the reference signal pattern comprises code division multiplexing on the resource elements among the antenna ports in the frequency domain.

The storage unit 201 may store, with respect to different numbers of antenna ports, corresponding reference signal patterns. The reference signal patterns include but are not limited to those illustrated in the first embodiment. The user equipment may receive a parameter related to the reference signal from a base station, for example, through RRC signaling. In a case that the reference signal is a CSI-RS, the parameter may include at least one of: the number of antenna ports, a mapping relationship between CSI-RS and physical resource elements, a sub-frame offset, a CSI-RS period and a transmission power for a CSI-RS. The determining unit 202 determines, for example, the number of antenna ports based on the parameter related to the reference signal, and determines physical resource elements corresponding to the current reference signal based on the reference signal pattern stored in the storage unit 201. Since the current reference signal is carried in the determined physical resource elements, the measuring unit 203 measures a signal on the resource elements and report a measurement result to the base station, so that the base station can acquire for example downlink channel status information.

In the embodiment, the reference signal pattern includes code division multiplexing on resource elements among antenna ports in the frequency domain, and therefore, a power gain can be maintained to not exceed 6 dB in a case that the number of antenna ports for transmitting a reference signal is increased, and waste of power is reduced.

Third Embodiment

In the process of describing the devices at a base station side and at a user equipment side in a wireless communication system in the embodiments described above, obviously, some processing and methods are also disclosed. Hereinafter, an overview of the methods is given without repeating some details disclosed above. However, it should be noted that, although the methods are disclosed in a process of describing the devices at a base station side and at a user equipment side in a wireless communication system, the methods do not certainly employ or are not certainly executed by the aforementioned components. For example, the embodiments of the devices at a base station side and at a user equipment side in a wireless communication system may be partially or completely implemented with hardware and/or firmware, the methods described below may be executed by a computer-executable program completely, although the hardware and/or firmware of the devices at a base station side and at a user equipment side in a wireless communication system can also be used in the methods.

Figure 22:
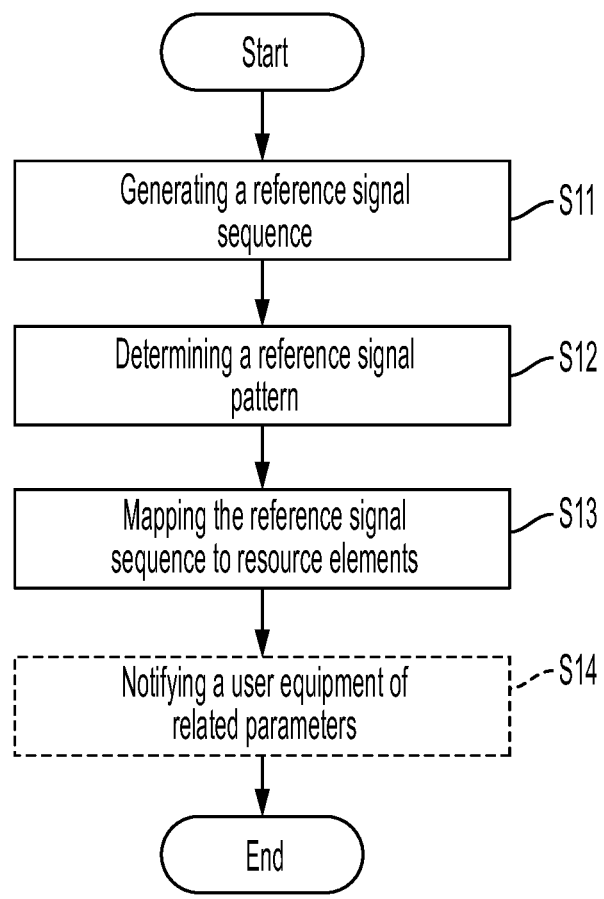
FIG. 22 is a flowchart showing a method on a base station side in a wireless communication system according to an embodiment of the present disclosure.

FIG. 22 shows a flowchart of a method on a base station side in a wireless communication system according to an embodiment of the present disclosure. The method includes: generating a reference signal sequence (S11); determining, based on the number of antenna ports for transmitting a reference signal, a reference signal pattern constituted by a mapping relationship between the antenna ports and resource elements of physical transmission resources (S12), and mapping, based on the reference signal pattern, the reference signal sequence to the resource elements for transmission (S13), wherein the reference signal pattern comprises code division multiplexing on the resource elements among the antenna ports in the frequency domain.

In an example, in step S12, at least two common resource elements corresponding to the same OFDM symbol are configured for a first antenna port and a second antenna port, and orthogonal cover codes which are orthogonal to each other are configured for the first antenna port and the second antenna port, so as to perform code division multiplexing on the resource elements among the antenna ports in the frequency domain.

In an example, in step S12, configuration is performed on at least two antenna ports with port numbers having the same parity to perform code division multiplexing in the frequency domain. In addition, the reference signal pattern may further include code division multiplexing on resource elements among antenna ports in the time domain.

Code division multiplexing with a large code length is used in a case that there are a large number of antenna ports, to be compatible with code division multiplexing having a small code length in a case that there are a small number of antenna ports.

In step S12, in order to improve flexibility of resource mapping and therefore take full advantage of idle resource to transmit a reference signal, a reference signal pattern crossing a first number of OFDM symbols may be determined for the first antenna port, and a reference signal pattern crossing a second number of OFDM symbols may be determined for the second antenna port, to transmit the first antenna port and the second antenna port respectively.

As an example, the reference signal is a channel status information reference signal (CSI-RS). In step S12, in a case that the number of antenna ports for transmitting a CSI-RS is greater than 8, a reference signal pattern comprising code division multiplexing on resource elements among antenna ports in the frequency domain may be determined, so as to perform resource mapping.

For example, the channel status information reference signal pattern may include at least one of: a pattern based on a pair of physical resource blocks, a pattern based on two or more adjacent sub-frames, and a pattern based on two or more adjacent physical resource blocks.

A code length of code division multiplexing may be changed with the number of sub-frames on which the channel status information reference signal pattern is based.

Exemplarily, in a case that the number of antenna ports is 16, a code length for code division multiplexing is 4 in a case that the number of sub-frames on which the channel status information reference signal pattern is based is 1, and a code length for code division multiplexing is 2 in a case that the number of sub-frames on which the channel status information reference signal pattern is based is 2.

In addition, in a case that the number of antenna ports is 32, the CSI-RS pattern may be an extension of the channel status information reference signal pattern with the code length of 4 for the code division multiplexing in two adjacent sub-frames.

In channel status information reference signals patterns of different cells, physical resource elements corresponding to the same port may be set to be far away from each other, to reduce interference between reference signals of small cells.

In addition, in a case that a TDD mode is used for wireless communications, a channel status information reference signal may be transmitted in a special sub-frame DwPTS. In this case, the channel status information reference signal pattern is a pattern based on two adjacent physical resource blocks.

As shown in dashed line box of FIG. 22, the above method may further include step S14: notifying a user equipment of a parameter related to the channel status information reference signal through CSI-RS-Config in RRC signaling.

For example, the parameter includes at least one of: the number of antenna ports, a mapping relationship between channel status information reference signals and physical resource elements, a sub-frame offset, a period of a channel status information reference signal and a transmission power of a channel status information reference signal.

Correspondingly, a method on a user equipment side in a wireless communication system is further provided, which includes: determining, based on a stored reference signal pattern and a parameter related to the reference signal from a base station side, physical resource elements corresponding to a current reference signal, wherein the reference signal pattern is constituted by a mapping relationship between predetermined antenna ports and resource elements of physical transmission resources; and measuring a reference signal on the determined physical resource elements, to report measured information to the base station side, wherein the reference signal pattern comprises code division multiplexing on the resource elements among the antenna ports in the frequency domain.

It is to be noted that, the above methods can be used separately or in conjunction with each other. The details have been described in detail in the first and second embodiments, and are not repeatedly described here.

In addition, a communication system is further provided in the above description, which includes a base station and a user equipment. The base station includes the device 100, and the user equipment includes the device 200.

The technology of the present disclosure may be applied to various products. For example, the base station may be realized as any type of evolved Node B (eNB) such as a macro eNB and a small eNB. The small eNB may be an eNB such as a pico eNB, a micro eNB, and a home (femto) eNB that covers a cell smaller than a macro cell. Instead, the base station may be realized as any other types of base stations such as a NodeB and a base transceiver station (BTS). The base station may include a main body (that is also referred to as a base station apparatus) configured to control radio communication, and one or more remote radio heads (RRH) disposed in a different place from the main body. In addition, various types of terminals may each operate as the base station by temporarily or semi-persistently executing a base station function.

For example, the user equipment may be implemented as a mobile terminal such as a smartphone, a tablet personal computer (PC), a notebook PC, a portable game terminal, a portable/dongle type mobile router, and a digital camera, or an in-vehicle terminal such as a car navigation apparatus served by the base station. The user equipment may also be realized as a terminal (that is also referred to as a machine type communication (MTC) terminal) that performs machine-to-machine (M2M) communication. Furthermore, the user equipment may be a radio communication module (such as an integrated circuit module including a single die) mounted on each of the above mentioned terminals.

Application Example Regarding Base Station

First Application Example

Figure 23:
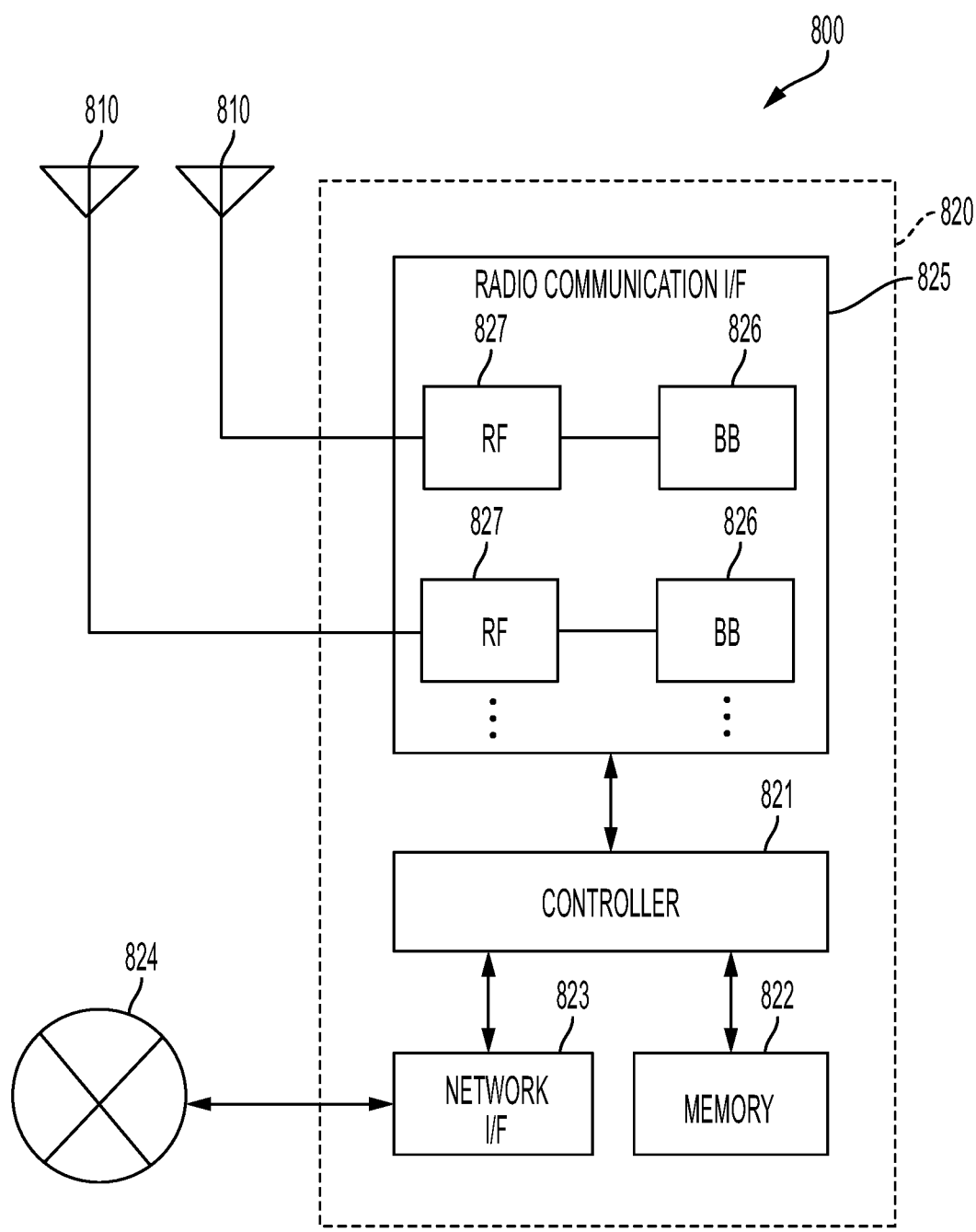
FIG. 23 is a block diagram showing a first example of a schematic configuration of an eNB in which the technology according to the present disclosure may be applied.

FIG. 23 is a block diagram showing a first example of a schematic configuration of an eNB in which the technology according to the present disclosure cam be applied. An eNB 800 includes a single or multiple antennas 810 and a base station device 820. The base station device 820 may be connected to each of the antennas 810 via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as shown in FIG. 23. For example, the multiple antennas 810 may be compatible with multiple frequency bands used by the eNB 800. Although FIG. 23 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be for example a CPU or a DSP, and operates various functions of a high layer of the base station device 820. For example, the controller 821 generates a data package based on data in a signal processed by the radio communication interface 825, and transfers the generated package via the network interface 823. The controller 821 may bundle data from multiple baseband processors to generate a bundling package, and transfers the generated bundling package. The controller 821 may has a logical function for performing the following controls: radio resource control, radio bearer control, mobility management, admission control and scheduling. The control may be performed in conjunction with a nearby eNB or core network node. The memory 822 includes RAM and ROM, and stores programs to be executed by the controller 821 and various types of control data (such as terminal list, transmission power data and scheduling data).

The network interface 823 is a communication interface for connecting the base station device 820 to a core network 824. The controller 821 may communicate with a core network node or another eNB via the network interface 823. In this case, the eNB 800 may be connected with the core network node or other eNBs via a logic interface (such as interface S1 and interface X2). The network interface 823 may be a wired communication interface or a radio communication interface for wireless backhaul routing. If the network interface 823 is a radio communication interface, the network interface 823 may use a higher frequency band for radio communication as compared with that used by the radio communication interface 825.

The radio communication interface 825 supports any cellular communication scheme (such as Long Term Evolution (LTE) and LTE-advanced), and provides a radio connection to a terminal located in a cell of the eNB 800 via the antenna 810. The radio communication interface 825 may generally include for example a baseband (BB) processor 826 and an RF circuit 827. The BB processor 826 may perform for example coding/decoding, modulation/demodulation and multiplexing/demultiplexing, and performs various types of signal processing of layer (such as L1, Media Access Control (MAC), Radio Link Control (RLC) and Packet Data Convergence Protocol (PDCP)). Instead of the controller 821, the BB processor 826 may have a portion or all of the above logical functions. The BB processor 826 may be a memory storing communication control programs, or a module including a processor and a related circuit which are configured to execute programs. In this way, the function of the BB processor 826 may be changed when the programs are updated. The module may be a card or blade inserted into the slot of the base station device 820. Alternatively, the module may be a chip mounted on the card or the blade. Meanwhile, the RF circuit 827 may include for example frequency mixer, a filter and an amplifier, and transmit and receive a wireless signal via the antenna 810.

As shown in FIG. 23, the radio communication interface 825 may include multiple BB processors 826. For example, the multiple BB processors 826 may be compatible with the multiple frequency bands used by the eNB 800. As shown in FIG. 23, the radio communication interface 825 may include multiple RF circuits 827. For example, the multiple RF circuits 827 may be compatible with multiple antenna elements. Although an example in which the radio communication interface 825 includes multiple BB processors 826 and multiple RF circuits 827 is shown in FIG. 23, the radio communication interface 825 may include a single BB processor 826 and a single RF circuit 827.

Second Application Example

Figure 24:
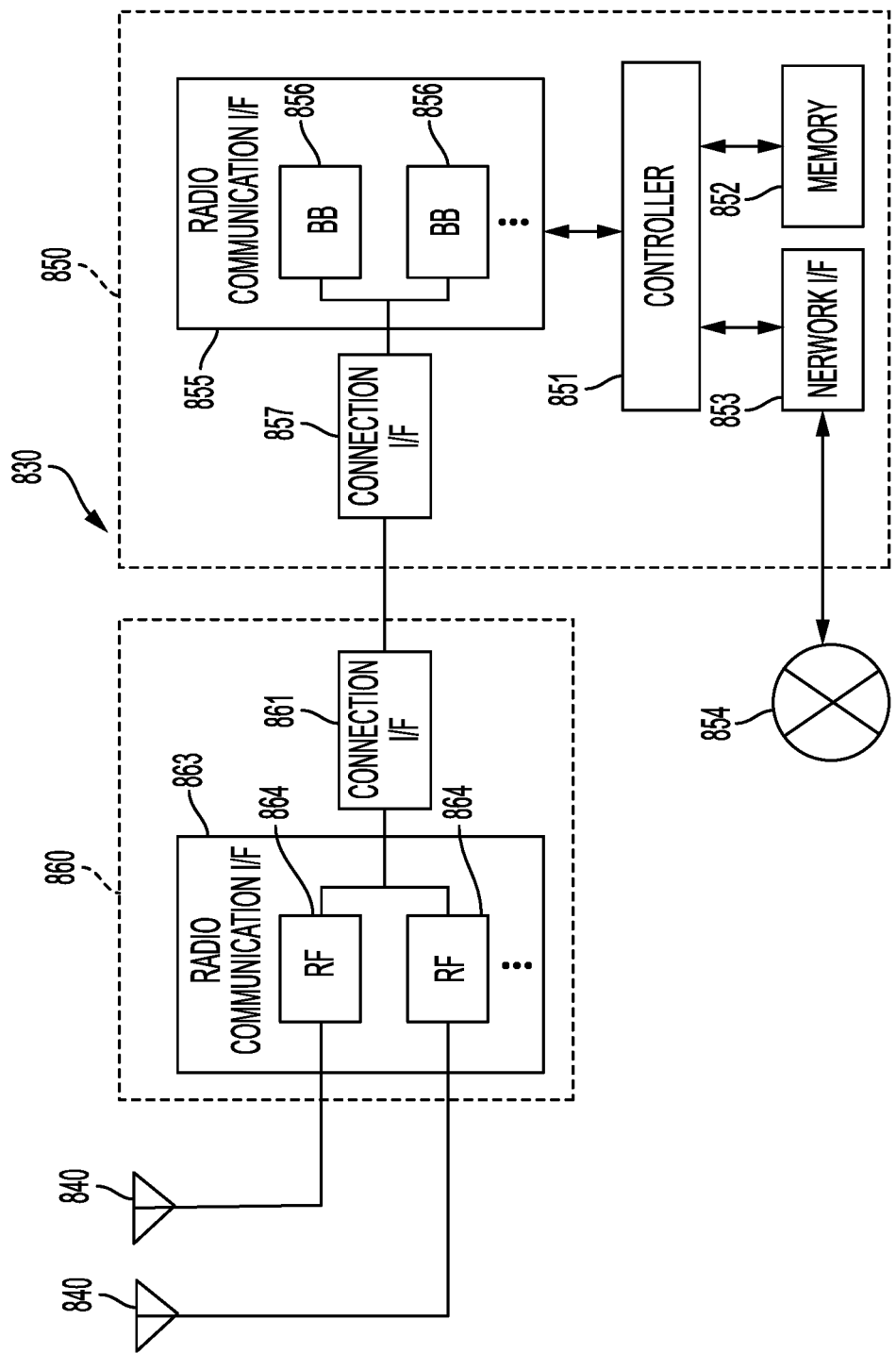
FIG. 24 is a block diagram showing a second example of a schematic configuration of an eNB in which the technology according to the present disclosure may be applied.

FIG. 24 is a block diagram showing a second example of a schematic configuration of an eNB in which the technology according to the present disclosure may be applied. An eNB 830 includes a single or multiple antennas 840, a base station device 850 and an RRH 860. The RRH 860 may be connected with each of the antennas 840 via an RF cable. The base station device 850 and RRH 860 may be connected to each other via a high-speed line such as fiber cable.

Each of the antennas 840 includes a single or multiple antennal elements (such as multiple antenna elements included in a multiple-input multiple-output (MIMO) antenna), and is for the RRH 860 to transmit and receive a wireless signal. As shown in FIG. 24, the eNB 830 may include multiple antennas 840. For example, the multiple antennas 840 may be compatible with multiple frequency bands used by the eNB 830. Although FIG. 24 shows the example in which the eNB 830 includes multiple antennas 840, the eNB 830 may include a single antenna 840.

The base station device 850 includes a controller 851, a memory 852, a network interface 853, a radio communication interface 855 and a connection interface 857. The controller 851, the memory 852 and network interface 853 are the same as the controller 821, memory 822 and network interface 823 described with reference to FIG. 23.

The radio communication interface 855 supports any cellular communication scheme (such as LTE and LTE-advanced), and provides a wireless communication to a terminal located in a sector corresponding to the RRH 860 via the RRH 860 and the antenna 840. The radio communication interface 855 may generally include for example a BB processor 856. The BB processor 856 is the same as the BB processor 826 described with reference to FIG. 23, except that the BB processor 856 is connected to an RF circuit 864 of the RRH 860 via the connection interface 857. As shown in FIG. 24, the radio communication interface 855 may include multiple BB processors 856. For example, the multiple BB processors 856 may be compatible with the multiple frequency bands used by the eNB 830. Although an example in which the radio communication interface 855 includes multiple BB processors 856 is shown in FIG. 24, the radio communication interface 855 may include a single BB processor 856.

The connection interface 857 is configured to connect the base station device 850 (radio communication interface 855) to the RRH 860. The connection interface 857 may be a communication module for connecting the base station device 850 (radio communication interface 855) to a communication in the above high-speed line of the RRH 860.

The RRH 860 includes a connection interface 861 and a radio communication interface 863.

The connection interface 861 is configured to connect the RRH 860 (radio communication interface 863) to the base station device 850. The connection interface 861 may be a communication module for the communication in the above high-speed line.

The radio communication interface 863 transmits and receives a wireless signal via the antenna 840. The radio communication interface 863 may generally include for example the RF circuit 864. The RF circuit 864 may include for example frequency mixer, a filter and an amplifier, and transmits and receives a wireless signal via the antenna 840. As shown in FIG. 24, the radio communication interface 863 may include multiple RF circuits 864. For example, the multiple RF circuits 864 may support multiple antenna elements. The radio communication interface 863 may include a single RF circuit 864 although the example in which the radio communication interface 863 includes multiple RF circuits 864 is shown in FIG. 24.

In the eNB 800 and the eNB 800 shown in FIG. 23 and FIG. 24, the notifying unit described with reference to FIG. 1 may be implemented with the radio communication interface 825 and the wireless communication interface 855 and/or the wireless communication interface 863. At least a part of functions may also be implemented by the controller 821 and the controller 851. For example, the controller 821 and the controller 851 or the base band processors 826 and 856 may generate a reference signal by executing functions of the sequence generating unit 101 and the resource mapping unit 1023.

II. Application Example Regarding User Equipment

First Application Example

Figure 25:
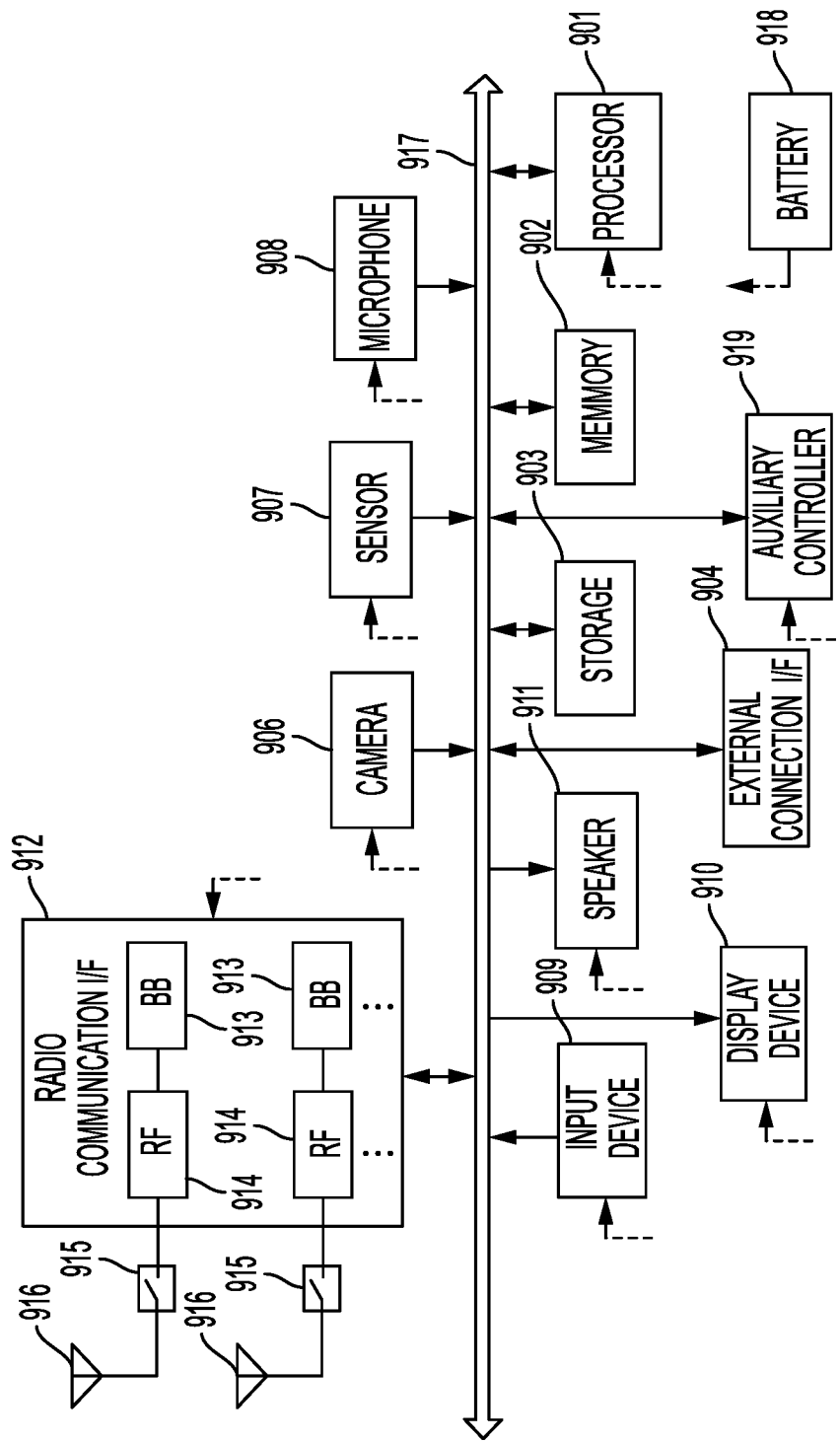
FIG. 25 is a block diagram showing an example of a schematic configuration of a smart phone in which the technology according to the present disclosure may be applied.

FIG. 25 is a block diagram showing an example of a schematic configuration of a smart phone 900 in which the technology according to the present disclosure may be applied. The smart phone 900 includes a processor 901, a memory 902, a storage 903, an external connection interface 904, a camera 906, a sensor 907, a microphone 908, an input device 909, a display device 910, a speaker 911, a radio communication interface 912, a single or multiple antenna switches 915, a single or multiple antennas 916, a bus 917, a battery 918 and an auxiliary controller 919.

The processor 901 may be for example a CPU or a system on chip (SoC), and controls functions of an application layer and an additional layer of the smart phone 900. The memory 902 includes RAM and ROM, and stores programs executed by the processor 901 and data. The storage 903 may include a storage medium such as a semiconductor memory and a hard disk. The external connection interface 904 refers to an interface connecting an external device (such as a memory card and a universal serial bus (USB) device) to the smart phone 900.

The camera 906 includes an image sensor (such as a charge-coupled device (CCD) and a complementary metal oxide semiconductor (CMOS)), and generates a captured image. The sensor 907 may include a group of sensors such as a measurement sensor, a gyroscope sensor, a geomagnetic sensor and an acceleration sensor. The microphone 908 converts voice inputted to the smart phone 900 into an audio signal. The input device 909 includes for example a touch sensor, a keypad, a keyboard, a button or a switch configured to detect touch on a screen of the display device 910, and receives an operation or information inputted by the user.

The display device 910 includes a screen (such as a liquid crystal display (LCD) and an organic light-emitting diode (OLED) display), and displays an output image of the smart phone 900. The speaker 911 converts the audio signal outputted from the smart phone 900 into voice.

The radio communication interface 912 supports any cellular communication scheme (such as LTE and LTE-advanced), and performs a wireless communication. The radio communication interface 912 may include for example a BB processor 913 and an RF circuit 914. The BB processor 913 may perform for example coding/decoding, modulation/demodulation and multiplexing/demultiplexing, and perform various types of signal processing for wireless communication. Meanwhile, the RF circuit 914 may include for example a frequency mixer, a filter and an amplifier, and transmit and receive a wireless signal via the antenna 916. The radio communication interface 912 may be a chip module on which the BB processor 913 and the RF circuit 914 are integrated. As shown in FIG. 25, the radio communication interface 912 may include multiple BB processors 913 and multiple RF circuits 914. Although FIG. 25 shows the example in which the radio communication interface 912 includes multiple BB processors 913 and multiple RF circuits 914, the radio communication interface 912 may include a single BB processor 913 or a single RF circuit 914.

In addition to the cellular communication scheme, the radio communication interface 912 may support an additional type of wireless communication scheme, such as a short-distance wireless communication scheme, a near field communication scheme and a wireless local area network (LAN) scheme. In this case, the radio communication interface 912 may include a BB processor 913 and a RF circuit 914 for each of the wireless communication schemes.

Each of the antenna switches 915 switches a connection destination of the antenna 916 between multiple circuits (such as circuits for different radio communication schemes) included in the radio communication interface 912.

Each of the antennas 916 includes a single or multiple antenna elements (such as multiple antenna elements included in the MIMO antenna), and is for the radio communication interface 912 to transmit and receive a wireless signal. As shown in FIG. 25, the smart phone 900 may include multiple antennas 916. Although FIG. 25 shows the example in which the smart phone 900 includes multiple antennas 916, the smart phone 900 may include a single antenna 916.

In addition, the smart phone 900 may include antennas 916 for different radio communication schemes. In this case, the antenna switch 915 may be omitted in the configuration of the smart phone 900.

The processor 901, the memory 902, the storage 903, the external connection interface 904, the camera 906, the sensor 907, the microphone 908, the input device 909, the display device 910, the speaker 911, the radio communication interface 912 and the auxiliary controller 919 are connected with one another via the bus 917. The battery 918 supplies power to the modules of the smart phone 900 shown in FIG. 25 via a feeder line. The feeder line is partially shown with a dash line in the drawing. The auxiliary controller 919 operates a minimum necessary function of the smart phone 900 in a sleep mode.

In the smart phone 900 shown in FIG. 25, for example, the processor 901 and the auxiliary controller 919 may execute functions of the determining unit 202 and the measuring unit 203, and the memory 902 executes functions of the storage unit 201, to measure a reference signal. A pan of functions of the determining unit 202 and the measuring unit 203 may also be implemented with the wireless communication interface 912.

Second Application Example

Figure 26:
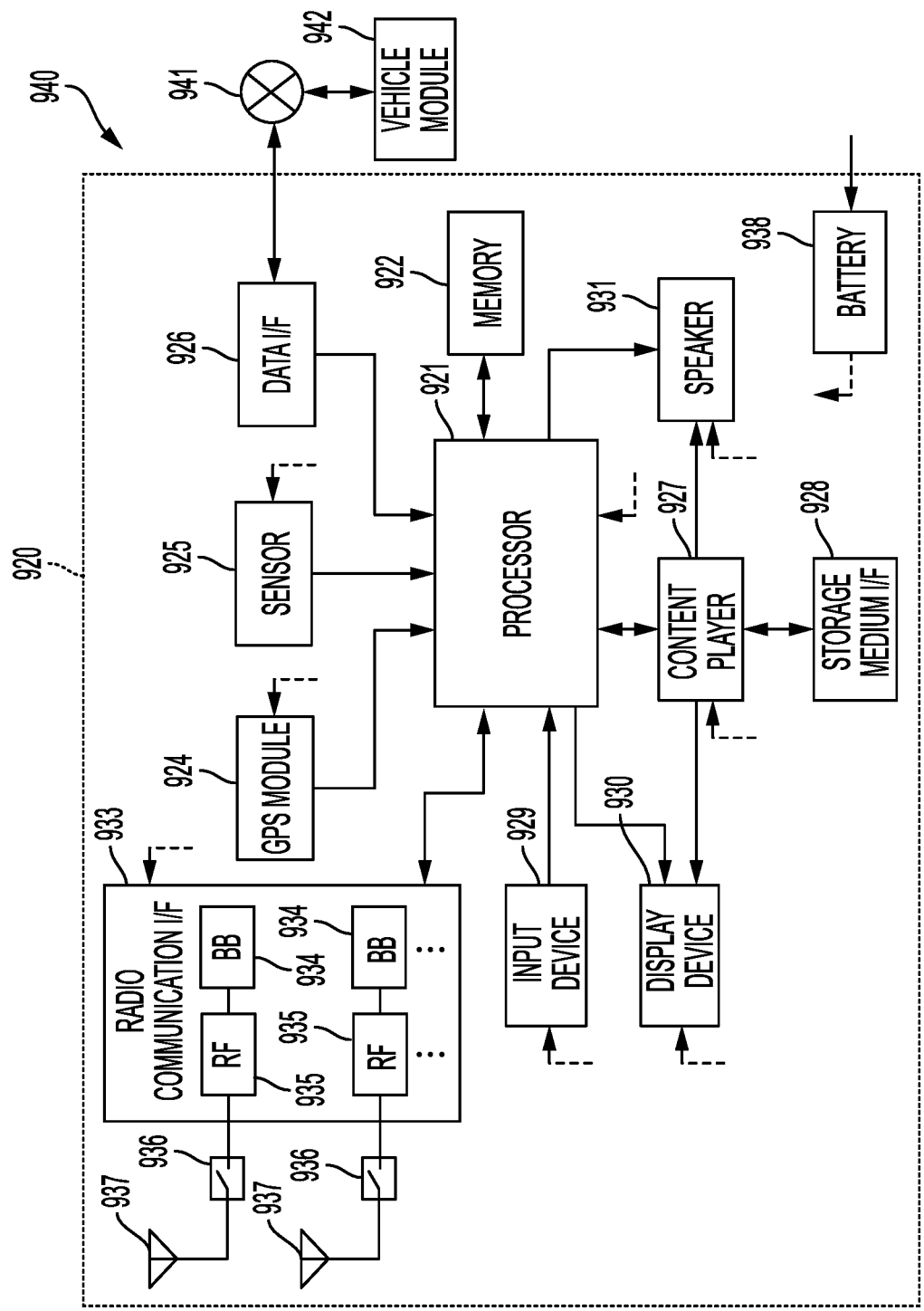
FIG. 26 is a block diagram showing an example of a schematic configuration of a car navigation apparatus in which the technology according to the present disclosure may be applied.

FIG. 26 is a block diagram showing an example of a schematic configuration of a car navigation apparatus 920 in which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, a single or multiple antenna switches 936, a single or multiple antennas 937 and a battery 938.

The processor 921 may be for example a CPU or a SoC, and controls a navigation function and additional function of the car navigation apparatus 920. The memory 922 includes RAM and ROM, and stores programs executed by the processor 921 and data.

The GPS module 924 determines the location of the car navigation apparatus 920 (such as latitude, longitude and height) with a GPS signal received from a GPS satellite. The sensor 925 may include a group of sensors such as a gyroscope sensor, a geomagnetic sensor and an air pressure sensor. The data interface 926 is connected to for example an on-board network 941 via a terminal that is not shown, and acquires data generated by the vehicle (such as vehicle speed data).

The content player 927 reproduces contents stored in a storage medium (such as CD and DVD) which is inserted into the storage medium interface 928. The input device 929 includes for example a touch sensor, a button or a switch configured to detect touch on a screen of the display device 930, and receives an operation or information inputted by the user. The display device 930 includes a screen such as an LCD or OLED display, and displays an image of navigation function or the reproduced contents. The speaker 931 outputs voice of the navigation function or the reproduced contents.

The radio communication interface 933 supports any cellular communication scheme (such as LTE and LTE-advanced), and performs a wireless communication. The radio communication interface 933 may generally include for example a BB processor 934 and an RF circuit 935. The BB processor 934 may perform for example coding/decoding, modulation/demodulation and multiplexing/demultiplexing, and perform various types of signal processing for wireless communication. Meanwhile, the RF circuit 935 may include for example a frequency mixer, a filter and an amplifier, and transmit and receive a wireless signal via the antenna 937. The radio communication interface 933 may be a chip module on which the BB processor 934 and the RF circuit 935 are integrated. As shown in FIG. 26, the radio communication interface 933 may include multiple BB processors 934 and multiple RF circuits 935. Although FIG. 26 shows the example in which the radio communication interface 933 includes multiple BB processors 934 and multiple RF circuits 935, the radio communication interface 933 may include a single BB processor 934 or a single RF circuit 935.

In addition to the cellular communication scheme, the radio communication interface 933 may support an another type of radio communication scheme, such as a short-distance wireless communication scheme, a near field communication scheme and a wireless local area network (LAN) scheme. In this case, the radio communication interface 933 may include a BB processor 934 and a RF circuit 935 for each of the radio communication schemes.

Each of the antenna switches 936 switches a connection destination of the antenna 937 between multiple circuits (such as circuits for different wireless communication schemes) included in the radio communication interface 933.

Each of the antennas 937 includes a single or multiple antenna elements (such as multiple antenna elements included in the MIMO antenna), and is for the radio communication interface 933 to transmit and receive a wireless signal. As shown in FIG. 26, the car navigation apparatus 920 may include multiple antennas 937. Although FIG. 26 shows the example in which the car navigation apparatus 920 includes multiple antennas 937, the car navigation apparatus 920 may include a single antenna 937.

In addition, the car navigation apparatus 920 may include antennas 937 for different radio communication schemes. In this case, the antenna switch 936 may be omitted in the configuration of the car navigation apparatus 920.

The battery 938 supplies power to the blocks of the car navigation apparatus 920 shown in FIG. 26 via a feeder line. The feeder line is partially shown with a dash line in the drawing. The battery 938 accumulates the power supplied from the vehicle.

In the car navigation apparatus 920 shown in FIG. 26, for example, the processor 921 may execute functions of the determining unit 202 and the measuring unit 203, and the memory 922 may execute functions of the storage unit 201, to measure a reference signal. A part of functions of the determining unit 202 and the measuring unit 203 may also be implemented via the wireless communication interface 933.

The technology of the present disclosure may also be implemented as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

It can be understood by those skilled in the art that for example the sequence generating unit, the resource mapping unit, the storage unit, the determining unit, the measuring unit and the like in the device described above may be implemented by one or more processors, and for example the notifying unit and the like can be implemented by a circuit element such as an antenna, a filter, a modem, a codec and the like.

Therefore, an electronic device (1) is further provided according to the present disclosure, which includes circuitry configured to: generate a reference signal sequence; and determine, based on the number of antenna ports for transmitting a reference signal, a reference signal pattern constituted by a mapping relationship between the antenna ports and resource elements of physical transmission resources, and map, based on the reference signal pattern, the reference signal sequence to the resource elements for transmission, wherein, the reference signal pattern includes code division multiplexing on the resource elements among the antenna ports in the frequency domain.

An electronic device (2) is further provided according to the present disclosure, which includes circuitry configured to: determine, based on a stored reference signal pattern and a parameter related to a reference signal from a base station side, physical resource elements corresponding to the current reference signal, where the reference signal pattern includes a mapping relationship between predetermined antenna ports and resource elements of physical transmission resources; and measure a reference signal on the determined physical resource elements to report measured information to the base station side. The reference signal pattern includes code division multiplexing on the resource elements among the antenna ports in the frequency domain.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 2700 shown in FIG. 27) from a storage medium or network, wherein the computer is capable of implementing various functions when installed with various programs.

Figure 27:
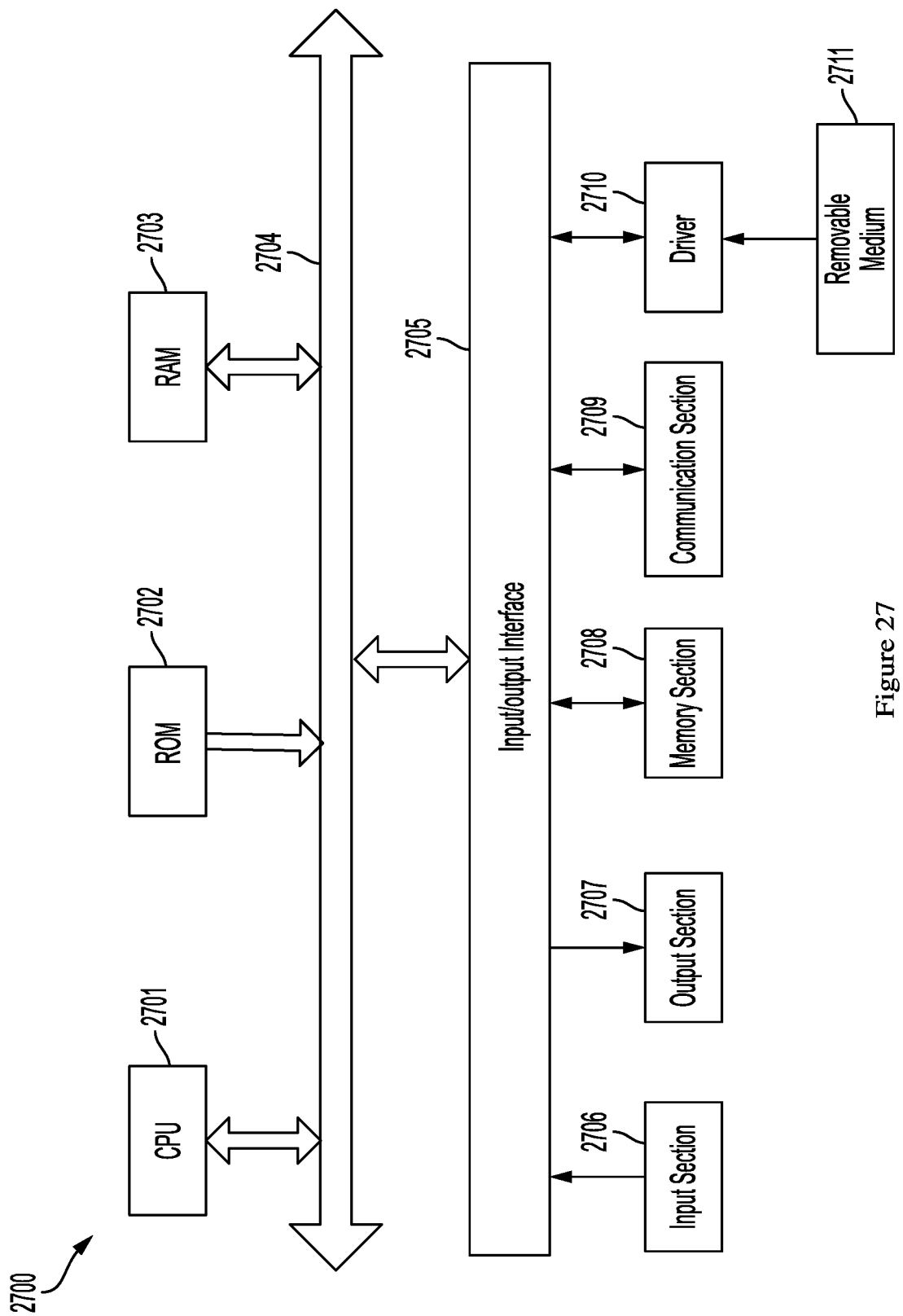
FIG. 27 is an exemplary block diagram illustrating the structure of a general purpose personal computer capable of realizing the method and/or device and/or system according to the embodiments of the present invention.

In FIG. 27, a central processing unit (CPU) 2701 executes various processing according to a program stored in a read-only memory (ROM) 2702 or a program loaded to a random access memory (RAM) 2703 from a memory section 2708. The data needed for the various processing of the CPU 2701 may be stored in the RAM 2703 as needed. The CPU 2701, the ROM 2702 and the RAM 2703 are linked with each other via a bus 2704. An input/output interface 2705 is also linked to the bus 2704.

The following components are linked to the input/output interface 2705: an input section 2706 (including a keyboard, a mouse and the like), an output section 2707 (including displays such as a cathode ray tube (CRT), a liquid crystal display (LCD), a loudspeaker and the like), a memory section 2708 (including hard disc and the like), and a communication section 2709 (including a network interface card such as a LAN card, modem and the like). The communication section 2709 performs communication processing via a network such as the Internet. A driver 2710 may also be linked to the input/output interface 2705 if needed. If needed, a removable medium 2711, for example, a magnetic disc, an optical disc, a magnetic optical disc, a semiconductor memory and the like, may be installed in the driver 2710, so that the computer program read therefrom is installed in the memory section 2708 as appropriate.

In the case where the foregoing series of processing is achieved with software, programs forming the software are installed from a network such as the Internet or a memory medium such as the removable medium 2711.

It should be appreciated by those skilled in the art that the storage medium is not limited to the removable medium 2711 shown in FIG. 27, which has program stored therein and is distributed separately from the apparatus so as to provide the programs to users. The removable medium 2711 may be, for example, a magnetic disc (including floppy disc (registered trademark)), a compact disc (including compact disc read-only memory (CD-ROM) and digital versatile disc (DVD)), a magneto optical disc (including mini disc (MD) (registered trademark)), and a semiconductor memory. Alternatively, the memory medium may be the hard discs included in ROM 2702 and the memory section 2708 in which programs are stored, and can be distributed to users along with the device in which they are incorporated.

To be further noted, in the device, method and system according to the present disclosure, the respective components or steps can be decomposed and/or recombined. These decompositions and/or recombinations shall be regarded as equivalent solutions of the present disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have not been listed definitely or an element(s) inherent to the process, method, article or device. Moreover, the expression "comprising a(n) . . . " in which an element is defined will not preclude presence of an additional identical element(s) in a process, method, article or device including the defined element(s) unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. A device on a base station side for wireless communications, comprising:
   circuitry configured to:
   generate a reference signal sequence; and
   determine, based on a number of antenna ports for transmitting a reference signal, a reference signal pattern constituted by a mapping relationship between the antenna ports and resource elements of physical transmission resources, and map, based on the reference signal pattern, the reference signal sequence to the resource elements for transmission, wherein
   the reference signal pattern includes code division multiplexing on the resource elements among the antenna ports in a frequency domain,
   the reference signal pattern is a channel status information reference signal (CSI-RS) pattern, and, in a case that the number of antenna ports for transmitting the reference signal is greater than 8, the circuitry is configured to determine the channel status information reference signal pattern which includes the code division multiplexing on the resource elements among the antenna ports in the frequency domain, for resource mapping, and a code length of the code division multiplexing is changed with a number of sub-frames on which the channel status information reference signal pattern is based.

2. The device according to claim 1, wherein the circuitry is configured to configure at least two common resource elements corresponding to a same orthogonal frequency division multiplexing symbol for a first antenna port and a second antenna port, and to configure orthogonal cover codes which are orthogonal to each other for the first antenna port and the second antenna port, respectively, to perform code division multiplexing on the at least two common resource elements among the antenna ports in the frequency domain.

3. The device according to claim 1, wherein the circuitry is configured to configure at least two antenna ports with port numbers having a same parity to perform code division multiplexing in the frequency domain.

4. The device according to claim 1, wherein the reference signal pattern further comprises code division multiplexing on the resource elements among the antenna ports in a time domain.

5. The device according to claim 1, wherein the channel status information reference signal pattern comprises at least one of: a pattern based on one physical resource block, a pattern based on adjacent two or more sub-frames and a pattern based on adjacent two or more physical resource blocks.

6. The device according to claim 1, wherein in a case that the number of the antenna ports is 16, the code length of the code division multiplexing is 4 in a case that the number of sub-frames on which the channel status information reference signal pattern is based is 1, and the code length of the code division multiplexing is 2 in a case that the number of sub-frames on which the channel status information reference signal pattern is based is 2.

7. The device according to claim 6, wherein in a case that the number of antenna ports is 32, the CSI-RS pattern is an extension of the channel status information reference signal pattern with the code length of 4 for the code division multiplexing in two adjacent sub-frames.

8. The device according to claim 1, wherein the circuitry is configured to use a code division multiplexing manner with a large code length in a case that there are a large number of antenna ports, to be compatible with a code division multiplexing manner with a small code length in a case that there are a small number of antenna ports.

9. The device according to claim 1, wherein the circuitry is configured to determine, for a first antenna port, a reference signal pattern crossing a first number of orthogonal frequency division multiplexing symbols, and to determine, for a second antenna port, a reference signal pattern crossing a second number of orthogonal frequency division multiplexing symbols, to transmit the first antenna port and the second antenna port respectively.

10. The device according to claim 1, wherein in a case that a time division duplexing mode is used for the wireless communications, the channel status information reference signal is transmitted in a special sub-frame DwPTS, and the channel status information reference signal pattern is a pattern based on two adjacent physical resource blocks.

11. The device according to claim 1, wherein in channel status information reference signals patterns for different cells, physical resource elements corresponding to a same port are far away from each other.

12. The device according to claim 1, wherein:
the circuitry is configured to notify a user equipment of a parameter related to the channel status information reference signal through CSI-RS-Config in RRC signaling.

13. The device according to claim 12, wherein the related parameter comprises at least one of: the number of antenna ports, a mapping relationship between channel status information reference signals and physical resources elements, a sub-frame offset, a period of the channel status information reference signal and transmission power of the channel status information reference signal.

14. A method on a base station side for wireless communications, comprising:
generating a reference signal sequence; and
determining, based on a number of antenna ports for transmitting a reference signal, a reference signal pattern constituted by a mapping relationship between the antenna ports and resource elements of physical transmission resources, and mapping, based on the reference signal pattern, the reference signal sequence to the resource elements for transmission, wherein
the reference signal pattern includes code division multiplexing on the resource elements among the antenna ports in a frequency domain,
the reference signal pattern is a channel status information reference signal (CSI-RS) pattern, and determining that, based on the number of antenna ports for transmitting the reference signal being greater than 8, the channel status information reference signal pattern which includes the code division multiplexing on the resource elements among the antenna ports in the frequency domain, for resource mapping, and
changing a code length of the code division multiplexing in accordance with a number of sub-frames on which the channel status information reference signal pattern is based.

15. A device on a user equipment side for wireless communications, comprising:
a memory to store a reference signal pattern constituted by a mapping relationship between predetermined antenna ports and resource elements of physical transmission resources; and
circuitry configured to
determine, based on the reference signal pattern and a parameter related to the reference signal from a base station side, physical resource elements corresponding to a current reference signal; and
measure a reference signal on the determined physical resource elements and to report measured information to the base station side, wherein
the reference signal pattern includes code division multiplexing on the resource elements among the antenna ports in a frequency domain,
the reference signal pattern is a channel status information reference signal (CSI-RS) pattern, and, in a case that a number of antenna ports for transmitting the reference signal is greater than 8, the circuitry is configured to determine the channel status information reference signal pattern which includes the code division multiplexing on the resource elements among the antenna ports in the frequency domain, for resource mapping, and
a code length of the code division multiplexing is changed based on a number of sub-frames on which the channel status information reference signal pattern is based.

* * * * *